United States Patent [19]
Cai et al.

[11] Patent Number: 5,960,040
[45] Date of Patent: Sep. 28, 1999

[54] COMMUNICATION SIGNAL PROCESSORS AND METHODS

[75] Inventors: Khiem V. Cai, Brea; Allan L. Levine, Jr., Newbury Park, both of Calif.

[73] Assignee: Raytheon Company, Lexington, Mass.

[21] Appl. No.: 08/761,103

[22] Filed: Dec. 5, 1996

[51] Int. Cl.$^6$ .................................................. H04L 27/18
[52] U.S. Cl. .................... 375/279; 375/206; 375/308; 375/329; 329/304; 332/103
[58] Field of Search ................................. 375/200, 206, 375/208, 268–272, 274, 279, 286, 302, 308, 332, 327; 329/304; 332/103

[56] References Cited

U.S. PATENT DOCUMENTS 4,562,415   12/1985   McBiles .................................. 332/104
5,313,493   5/1994    Dutta ..................................... 375/283

*Primary Examiner*—Young T. Tse
*Attorney, Agent, or Firm*—Leonard A. Alkov; William C. Schubert; Glenn H. Lenzen, Jr.

[57] ABSTRACT

A digital signal processor is provided which is compatible with a large variety of modulation processes (e.g., BPSK, QPSK, $\pi/4$ QPSK, M-ary FSK and M-ary PSK). The processor has a transmit section which can convert input data streams into baseband I and Q signals and a receive section which can recover data streams from input baseband I and Q signals. The transmit section includes a direct I/Q modulator and a common phase modulator and the receive section includes an M-FSK to M-PSK converter and a common phase demodulator. The processor is particularly suited for realization as an application-specific integrated circuit (ASIC) which can be integrated in multiband, multimode transceivers.

52 Claims, 19 Drawing Sheets

| WAVEFORM | I(t), Q(t) PAIR | NOTES |
|---|---|---|
| QPSK | $d_i(t), d_q(t)$ | $d_i(t) = \pm 1$  IN-PHASE BIT STREAM<br>$d_q(t) = \pm 1$  QUADRATURE BIT STREAM |
| BPSK | $d(t), 0$ | $d(t) = \pm 1$  IN-PHASE BIT STREAM |
| DPSK | $d(t)d(t-T_{s1}), 0$ | $d(t) = \pm 1$  IN-PHASE BIT STREAM |
| SQPSK | $d_i(t), d_q(t-T_{s2}/2)$ | $d_i(t) = \pm 1$  IN-PHASE BIT STREAM<br>$d_q(t) = \pm 1$  QUADRATURE BIT STREAM |

| WAVEFORM | I(t), Q(t) PAIR | PHASE | CODE DATA TO PHASE |
|---|---|---|---|
| QPSK | $\cos(\theta(t)), \sin(\theta(t))$ | $\theta(t) = \text{angle}(d_i(t), d_q(t))$ | $d_i(t) = \pm1$ IN-PHASE BIT STREAM<br>$d_q(t) = \pm1$ QUADRATURE BIT STREAM<br>$\theta(t) = 45°, 135°, 225°, 315°$ |
| BPSK | $\cos(\theta(t)), \sin(\theta(t))$ | $\theta(t) = \text{angle}(d(t), 0)$ | $d_i(t) = \pm1$ IN-PHASE BIT STREAM<br>$d_q(t) = 0$<br>$\theta(t) = 0°, 180°$ |
| DPSK | $\cos(\theta(t)), \sin(\theta(t))$ | $\theta(t) = \theta(t-T_{s1}) + \text{angle}(d(t), 0)$ | $d(t) = \pm1$ INPUT BIT STREAM<br>$d_q(t) = 0$<br>$\theta(t) = 0°, 180°$ |
| SQPSK | $\cos(\theta(t)), \sin(\theta(t))$ | $\theta(t) = \text{angle}(d_i(t), d_q(t-T_{s2}/2))$ | $d_i(t) = \pm1$ IN-PHASE BIT STREAM<br>$d_q(t) = \pm1$ QUADRATURE BIT STREAM<br>$\theta(t) = 45°, 135°, 225°, 315°$ |
| π/4 DQPSK | $\cos(\theta_i), \sin(\theta_q)$ | $\theta_i = \theta_{i-1} + \phi(d_i(t), d_q(t))$ | $d_i(t) = \pm1$ IN-PHASE BIT STREAM<br>$d_q(t) = \pm1$ QUADRATURE BIT STREAM<br>$\theta(t) = 45°, 135°, 225°, 315°$ |
| FSK | $\cos(\theta(t)), \sin(\theta(t))$ | $\theta(t) = (f_d/2) \int d_K dt$<br>$= \theta(t-\Delta t) + (f_d/2)d_k$ | $d_j(t) = \pm1$ IS SIGNAL LEVEL<br>$d_K(t) = \pm1, 1-(M-1) \cdots -3, -1, 1, 3 \cdots(M-1)$ |
| MSK | $\cos(\theta(t)), \sin(\theta_{(t)})$ | $\theta(t) = \int f_j dt$<br>$= \theta(t-T_{cb}/k) + f_k \times T_{cb}/k$ | $f_j = -R_{cb}/4$ if $d_j(t) = d_j(t-T_s)$<br>$= R_{cb}/4$ otherwise |

FIG. 10

| | DATA Q $d_i$ | BPSK PHASE $\theta$ | 2FSK FREQ $f$ |
|---|---|---|---|
| 302 → | 1 | 0 | $f_d/2$ |
| | -1 | $\pi$ | $-f_d/2$ |

FIG. 11A

| DATA Q $d_q$ | DATA I $d_i$ | QPSK PHASE $\theta$ | 4FSK FREQ $f$ |
|---|---|---|---|
| 1 | -1 | $3\pi/4$ | $3f_d/4$ |
| 1 | 1 | $\pi/4$ | $f_d/4$ |
| -1 | 1 | $-\pi/4$ | $-f_d/4$ |
| -1 | -1 | $-3\pi/4$ | $-3f_d/4$ |

| BIT 1 $d_1$ | BIT 2 $d_2$ | BIT 3 $d_3$ | 8PSK PHASE $\theta$ | 8FSK FREQ $f$ |
|---|---|---|---|---|
| 1 | -1 | 1 | $6\pi/8$ | $7f_d/2$ |
| 1 | -1 | -1 | $4\pi/8$ | $5f_d/2$ |
| 1 | 1 | -1 | $2\pi/8$ | $3f_d/2$ |
| 1 | 1 | 1 | 0 | $f_d/2$ |
| -1 | 1 | 1 | $-2\pi/8$ | $-f_d/2$ |
| -1 | 1 | -1 | $-4\pi/8$ | $-3f_d/2$ |
| -1 | -1 | -1 | $-6\pi/8$ | $-5f_d/2$ |
| -1 | -1 | 1 | $-8\pi/8$ | $-7f_d/2$ |

← 306

FIG. 11C

COMMUNICATION SIGNAL PROCESSORS AND METHODS

BACKGROUND OF THE INVENTION

1. Field of the Invention

The present invention relates generally to signal processors and more particularly to digital signal processors.

2. Description of the Related Art

A growing list of communication devices (e.g., pagers, cellular telephones, laptop computers, point-to-point radios and automotive radios) presently compete for access to wireless communication networks. Unfortunately, a variety of modulation processes have been adopted worldwide as wireless communication standards.

In the United States, for example, the Telecommunication Industry Association has adopted an Interim Standard (IS-95) which specifies the modulation processes of binary phase shift keying (BPSK) and quadrature phase shift keying (QPSK), the Post Office Standard Advisory Group has adopted (for pagers) the modulation process of frequency shift keying (FSK) and the United States Digital Cellular System (USDC) has adopted an Interim Standard (IS-54) which specifies the modulation process of $\pi/4$ quadrature phase shift keying ($\pi/4$QPSK). Other communication standards (e.g., ERMES in Europe and PDC in Japan) add still other modulation processes such as M-ary frequency shift keying (M-FSK) and differential quadrature phase shift keying (DQPSK).

Present communication transceivers are typically configured to be compatible with only a selected one of these various modulation processes. Accordingly, communication device users are either limited in their access to different wireless communication services or must accept the additional cost of obtaining a plurality of transceivers.

Although a transceiver that is compatible with a variety of modulation processes could be realized with a "brute force" integration of existing transceiver structures, this approach generally results in penalties of larger size, greater cost, duplication of functions and operability limitations.

SUMMARY OF THE INVENTION

The present invention is directed to communication processors and methods which are compatible with a plurality of modulation processes.

This goal is achieved with a digital processor which has a transmit path that includes a direct I/Q modulator and a common phase modulator which can convert an input data stream d(t) into output in-phase and quadrature I(t) and Q(t) signals that are in accordance with a variety of modulation processes.

The direct I/Q modulator supports processes which include BPSK, differential phase shift keying (DPSK), QPSK and offset quadrature phase shift keying (OQPSK). The common phase modulator supports these processes and many others (e.g., $\pi/4$QPSK, M-ary FSK, M-ary phase shift keying (M-ary PSK, and minimum shift keying (MSK) by coupling a bit to phase encoder and a sine/cosine look-up table with data paths that include a symbol phase integrator and a frequency integrator.

The digital processor also has a receive path that includes a gain controller, a signal resampler, a time estimator, a phase and frequency offset estimator and a common phase demodulator which can recover an output data stream d(t) from input in-phase and quadrature I(t) and Q(t) signals. In a narrow-band mode, the common phase demodulator demodulates various phase and frequency modulated waveforms (e.g., BPSK, DPSK, QPSK, $\pi/4$QPSK, SQPSK and M-ary FSK). In a spread spectrum mode, the common phase demodulator demodulates direct sequence pseudonoise (DSPN) waveforms with different modulation processes (e.g., DSPN/MSK, DSPN/BPSk. and DSPN/MSK). The demodulator is structured with decoders based on various decoding approaches, e.g., direct decoding, gray decoding and quasi-gray decoding.

The digital processor also has a programmable Viterbi decoder which can support numerous coding rates and constraint lengths and which can support puncture code schemes.

The processing methods of the invention are preferably implemented with the aid of a computer (e.g., a microprocessor) and the processor is particularly suited for realization as an application-specific integrated circuit (ASIC) which can be integrated in multiband, multimode transceivers.

BRIEF DESCRIPTION OF THE DRAWINGS

FIG. 10 is a table which specifies the use of a code between an input data stream d(t) and a phase stream $\theta(t)$ and the use of a sin/cos look-up table in the conversion of the phase stream $\theta(t)$ into output baseband in-phase and quadrature signals I(t) and Q(t) for selected modulation processes;

FIG. 11A is a table which specifies the code of FIG. 10 for binary phase shift keying and 2-ary frequency shift keying;

FIG. 11B is a table which specifies the code of FIG. 10 for quadrature phase shift keying and 4-ary frequency shift keying;

FIG. 11C is a table which specifies the code of FIG. 10 for 8-ary phase shift keying; and 8-ary frequency shift keying;

DETAILED DESCRIPTION OF THE PREFERRED EMBODIMENTS

Figure 1:
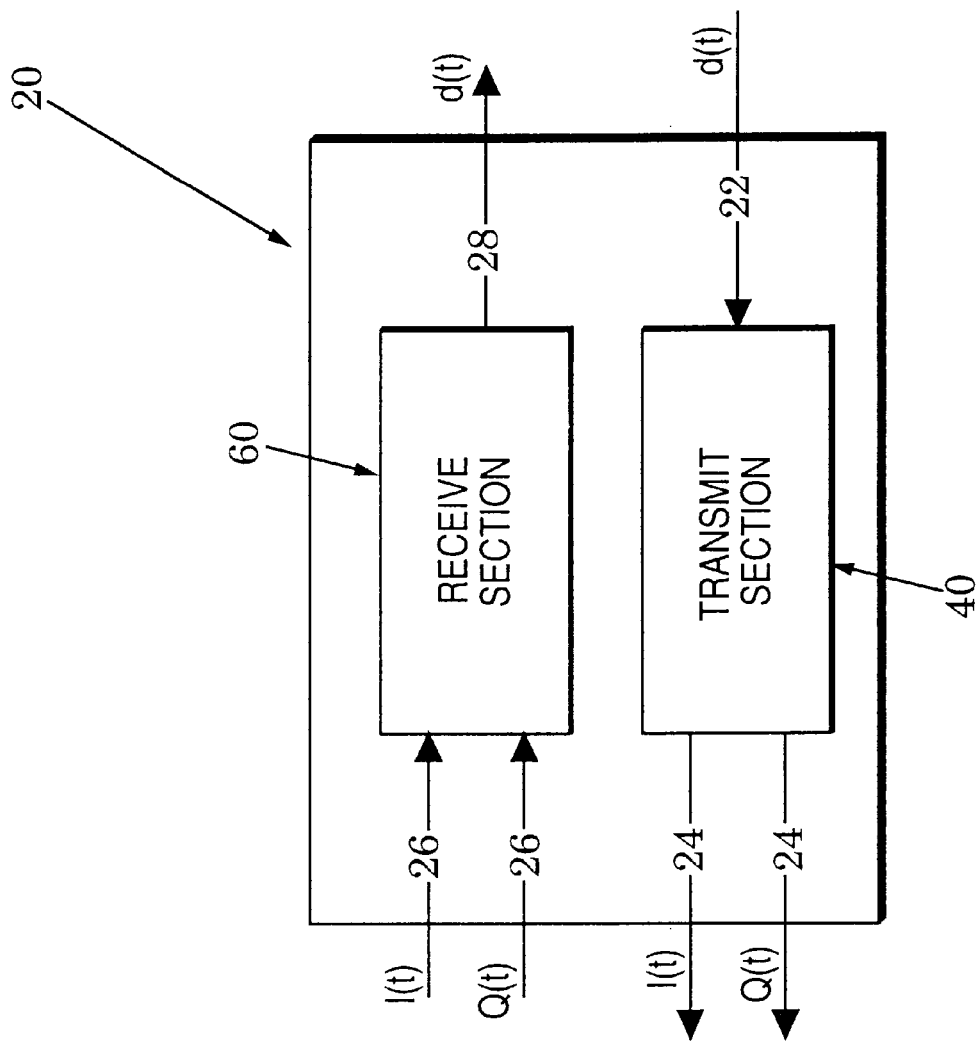
FIG. 1 is a block diagram of a communication signal processor in accordance with the present invention.

FIG. 1 shows a communication signal processor (CSP) 20 in accordance with the present invention. The CSP 20 includes a transmit section 40 and a receive section 60. The CSP transmit section 40 receives an input data stream d(t) 22 and converts it into output baseband in-phase I(t) and quadrature Q(t) signals 24 whose modulation rates include 4 Rs and 8 Rs in which Rs is the baud rate of the input bit stream d(t) 22. In an exemplary application of the CSP 20, the bit data stream 22 may be provided by digital samples of voice, facsimile or video sources and the output baseband in-phase I(t) and quadrature Q(t) signals 24 may be delivered to a digital tuner of a digital transceiver for modulation onto IF and RF carrier signals.

The CSP receive section 60 receives input baseband in-phase I(t) and quadrature Q(t) signals 26 and recovers from them an output data stream d(t) 28. In the exemplary application mentioned above, the input baseband in-phase I(t) and quadrature Q(t) signals 26 are received from a digital tuner of a digital transceiver and the output data stream d(t) 28 is delivered to a data bus that provides access to various communication devices. Detailed structure of the CSP transmit section 40 and CSP receive section 60 are shown respectively in FIGS. 2 and 3.

Figure 2:
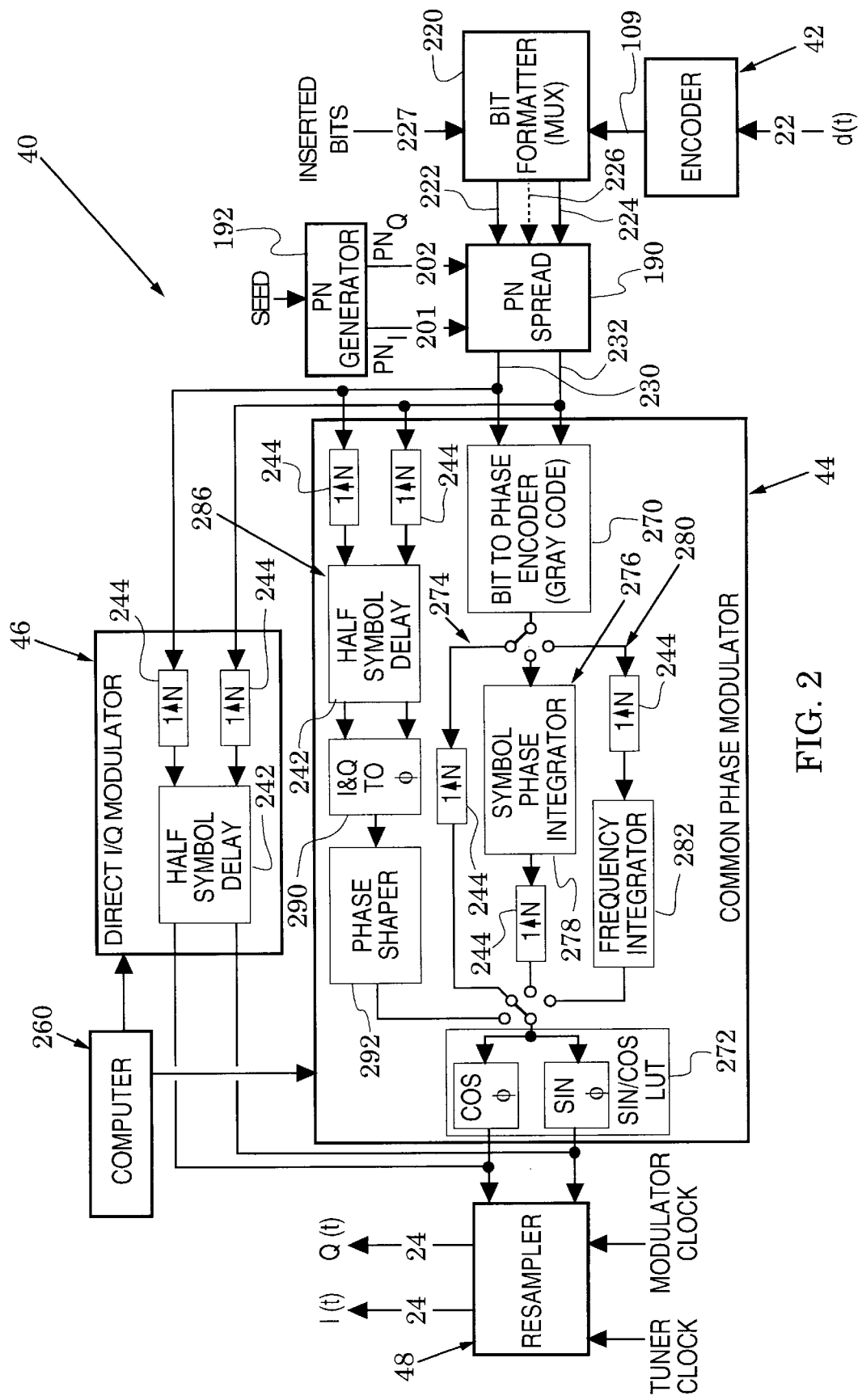
FIG. 2 is a block diagram of a transmit section of the communication signal processor of FIG. 1.

The CSP transmit section 40 of FIG. 2 converts the input digital bit stream 22 into the output baseband in-phase and quadrature I and Q signals 24 at the rate of 4Rs or 8Rs. Major portions of the transmit section 40 include an encoder 42, a common phase modulator 44, a direct I/Q modulator 46 and a signal resampler 48. A detailed description of the transmit section 40 is preceded by the following overview of these transmit section portions.

The encoder 42 receives the input data bit stream 22 and convolutionally encodes this bit stream to introduce redundant data bits which permits the CSP receive section 60 to detect and correct errors which occur in the communication link. The encoder 42 supports different constraint lengths (K=1, 2, - - - 9) and code rates (R=1/2, 1/3). It can also be programmed to support punctured codes.

The common phase modulator 44 converts the channel bits or symbols into I and Q baseband signals at sampling rates of 4 Rs or 8 Rs. For non-spread waveforms, the common phase modulator 44 is programmed to form I/Q baseband signals 24 for at least the following modulation processes: M-ary FSK (frequency shift keying), MSK (minimum shift keying), BPSK (binary shift keying), DPSK (differential shift keying), QPSK (quadrature phase shift keying), SQPSK (stagger quadrature phase shift keying is often referred to as OQPSK or offset quadrature phase shift keying; both terms may be used hereafter), DQPSK (differential quadrature phase shift keying) and π/4-DQPSK (π/4 differential quadrature phase shift keying). The transmit section 40 can generate direct sequence spread spectrum waveforms and the common phase modulator 44 can be programed to modulate these waveforms with modulations that include MSK, BPSK and QPSK.

For some simple modulation processes such as BPSK, DPSK, QPSK and OQPSK, the direct I/Q modulator 46 facilitates placement of the data bit stream 22 directly onto the I/Q baseband channels 24.

The signal resampler 48 uses linear interpolation processing to convert the bit rate of the input data stream 22 to the sampling rate of typical digital-to-analog converters which are generally used in digital transceivers to receive the I and Q baseband signals 24.

Figure 3:
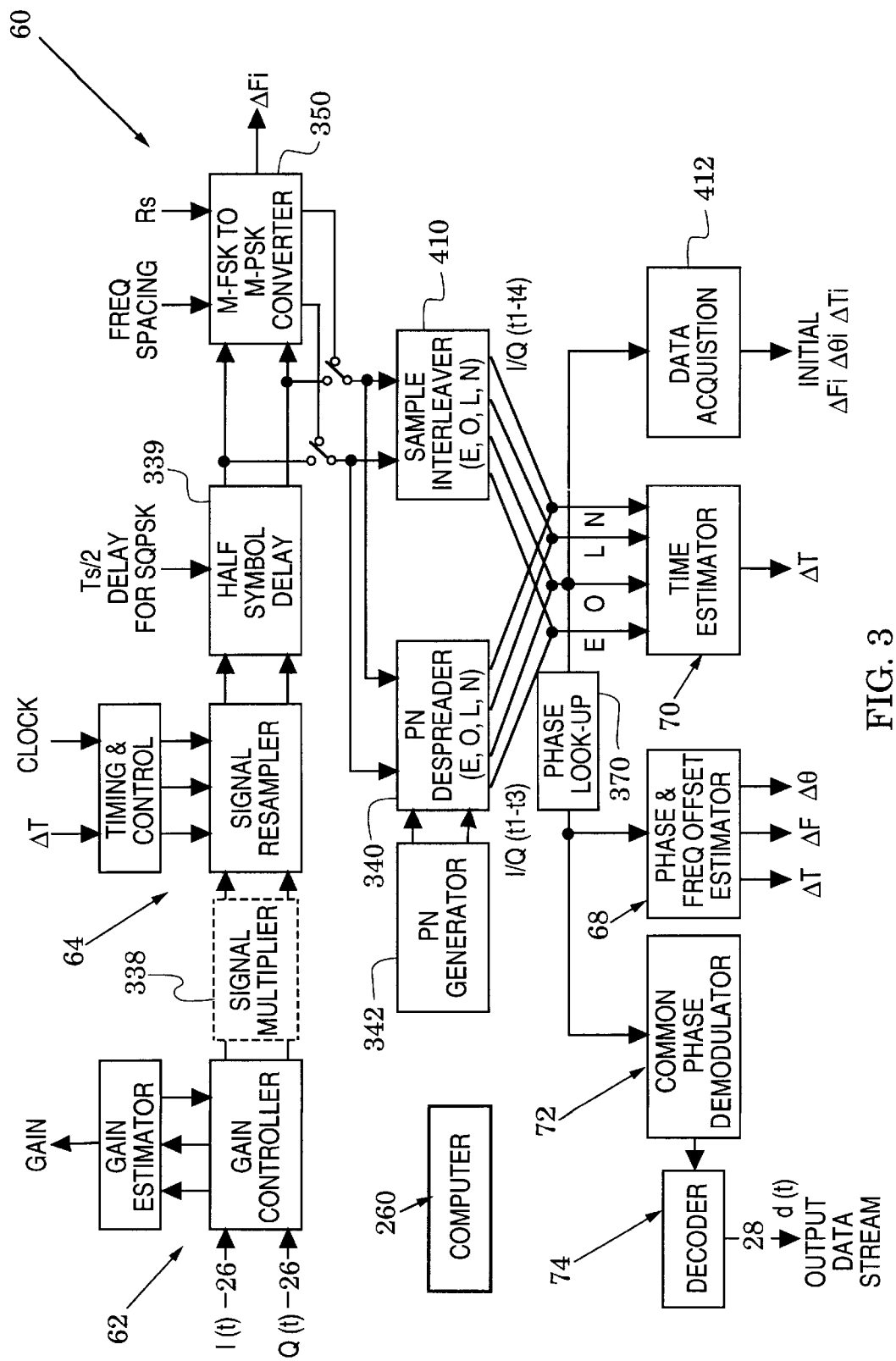
FIG. 3 is a block diagram of a receive section of the communication signal processor of FIG. 1.

The CSP demodulator 60 is illustrated in FIG. 3. The demodulator 60 is recovers from the input baseband I/Q signals 26 the output data stream 28. Major portions of the demodulator include a digital gain controller 62, a signal resampler 64, a signal multiplier 338, a phase and frequency offset estimator 68, a time offset estimator 70, a common phase demodulator 72 and a decoder 74. A detailed description of the demodulator 60 is preceded by the following overview of these major portions.

The digital gain control 62 maximizes the dynamic range of the I/Q baseband signals 26 by monitoring their magnitude statistics and applying an appropriate bit shift and limiter on the samples. As a result, the levels of the I/Q baseband signals 26 are adjusted to a desired signal level. Magnitude statistics that are used include sample peak level, magnitude average and percentage of samples which exceed a predetermined threshold.

The signal resampler 64 converts the received I and Q sampling rate to a desired rate of 4Rs or 8Rs. This process of the resampler 64 is basically the inverse of the process of the signal resampler (48 in FIG. 2) of the CPS transmit section (40 in FIG. 2).

The signal multiplier 338 uses a direct digital synthesizer to multiply an incoming signal with a sine/cosine pair at a specified frequency and phase. This causes the incoming signal to be shifted in frequency and phase which is critical for phase and frequency tracking.

The phase and frequency offset estimator 68 estimates the phase offset of a received signal based on the type of modulation of the signal. The frequency offset is computed from the phase offset over time. Both phase and frequency offsets can be corrected by the signal multiplier 338.

The time offset estimator 70 measures the amplitudes of early, on-time and late samples. From these, measurements, the time offset is typically calculated by interpolation. Time offset is then corrected at the signal resampler 64 to increase the signal-to-noise ratio (SNR) of the on-time sample.

The common phase demodulator 72 converts I and Q samples into a 3-bit soft-demodulated data stream. For non-spread waveforms, the common phase demodulator can demodulate signals which include M-ary FSK, MSK, BPSK, DPSK, QPSK, SQPSK, DQPSK and $\pi$/4-DQPSK signals. In the case of direct sequence spread spectrum waveforms, the demodulated signals include MSK, BPSK, and QPSK signals. The functions of the common phase demodulator 72 are basically the inverse of those of the common phase modulator (44 in FIG. 2).

The decoder 74 includes a Viterbi decoder which performs convolutional decoding and can support different constraint lengths (K=1, 2 - - - 9) and code rates (R=1/2, 1/3). It can also support punctured codes. Basically, the Viterbi decoder 74 performs the reverse function of the convolution encoder (46 in FIG. 2).

Having briefly described the major portions of the CSP modulator 40 and demodulator 60, attention is directed to a more detailed description of the CSP transmit section 40 of FIG. 2.

Data bits of the input data bit stream 22 are received into the encoder 42 which codes the data to facilitate the detection and correction of errors. In particular, the encoder 42 can include a convolutional encoder, a differential encoder and a code puncturer. The convolutional encoder corrects random errors and the differential encoder encodes the difference of the data symbols to allow an associated decoder (74 in FIG. 3) to remove data ambiguities. The differential encoder is illustrated in FIGS. 4A and 4B, the convolutional encoder is illustrated in FIGS. 5A and 5B and the code puncturer is illustrated in FIGS. 6A and 6B.

Figure 4A:
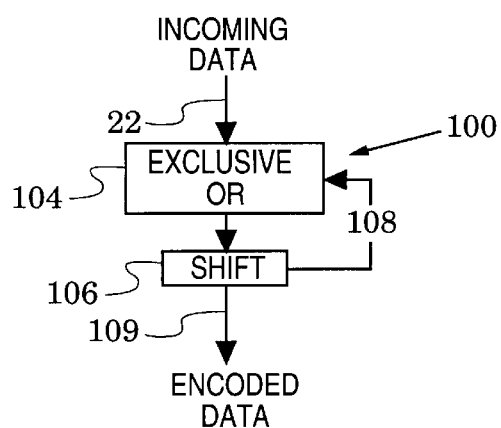
FIG. 4A is a flow diagram which illustrates operational steps of a differential encoder in the transmit section of FIG. 2.

Operation of the differential encoder is illustrated in flow diagram 100 of FIG. 4A in which the differential encoder performs an "exclusive OR" function on current and previous bit stream samples to create a new output data sample. "Current" incoming data 22 is received into an exclusive-OR process step 104. The output of process step 104 is shifted in time in process step 106 and fed back by path 108 to be the "previous" input of the process step 104. The encoded signal 109 (output of the encoder 42 of FIG. 2) is the output of process step 106. (This encoder differs in that it will perform any digital function on the two data samples, including bypass, to create the new output sample.

Figure 4B:
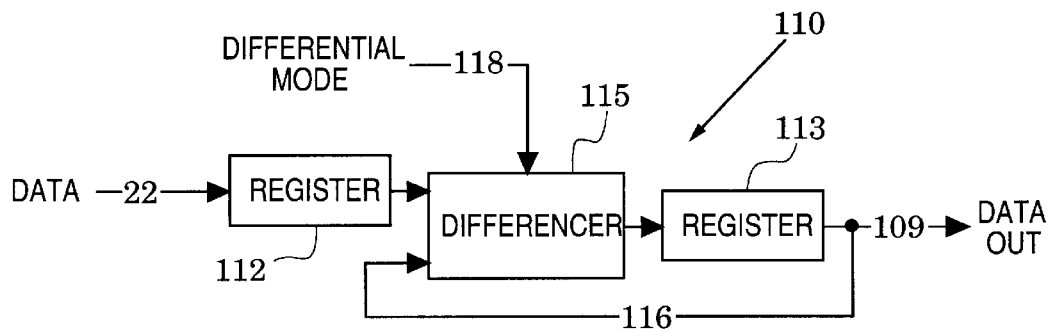
FIG. 4B is a block diagram of a differential encoder in accordance with the flow diagram of FIG. 4A.

An exemplary differential encoder 110 is shown in FIG. 4B. It has an input register 112 which receives the data 22 and an output register 113 which delivers the encoded data 109. Coupled between these registers is a differencer 115 and the output of the output register 113 is fed back as one to the inputs 116 to the differencer 115. The output of the input register 112 forms the other input of the differencer 115. The differencer 115 is responsive to a selection signal 118.

Figure 5A:
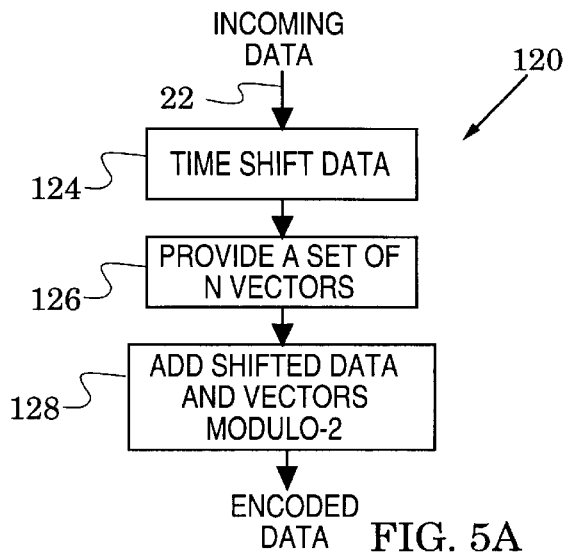
FIG. 5A is a flow diagram which illustrates operational steps of a convolutional encoder in the transmit section of FIG. 2.
Figure 5B:
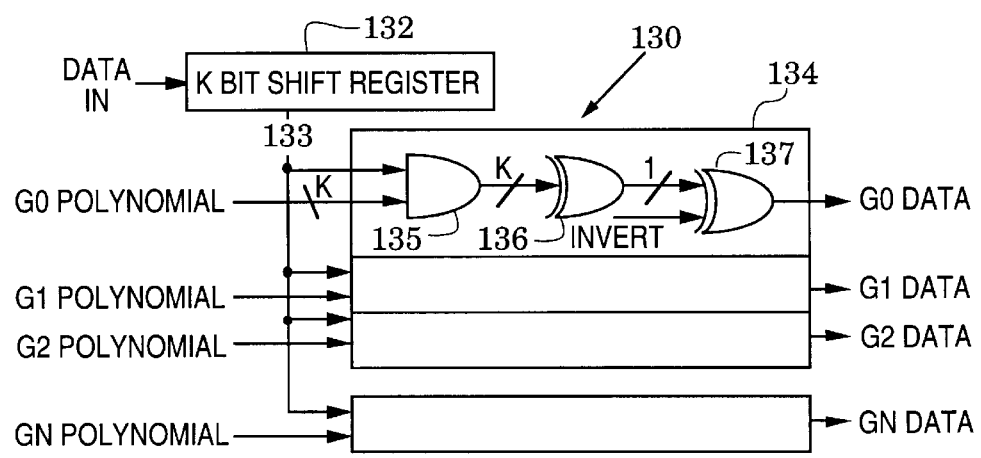
FIG. 5B is a block diagram of a convolutional encoder in accordance with the flow diagram of FIG. 5A.
Figure 6A:
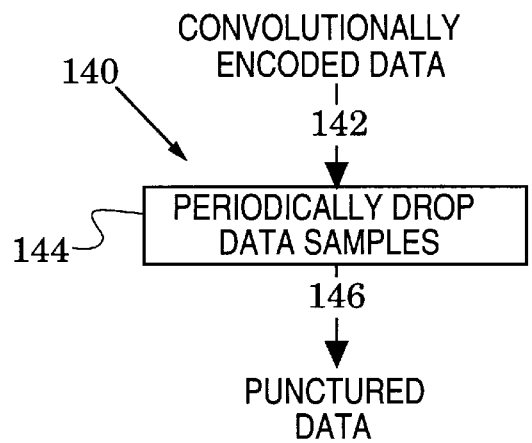
FIG. 6A is a flow diagram which illustrates operational steps of a code puncturer in the transmit section of FIG. 2.
Figure 6B:
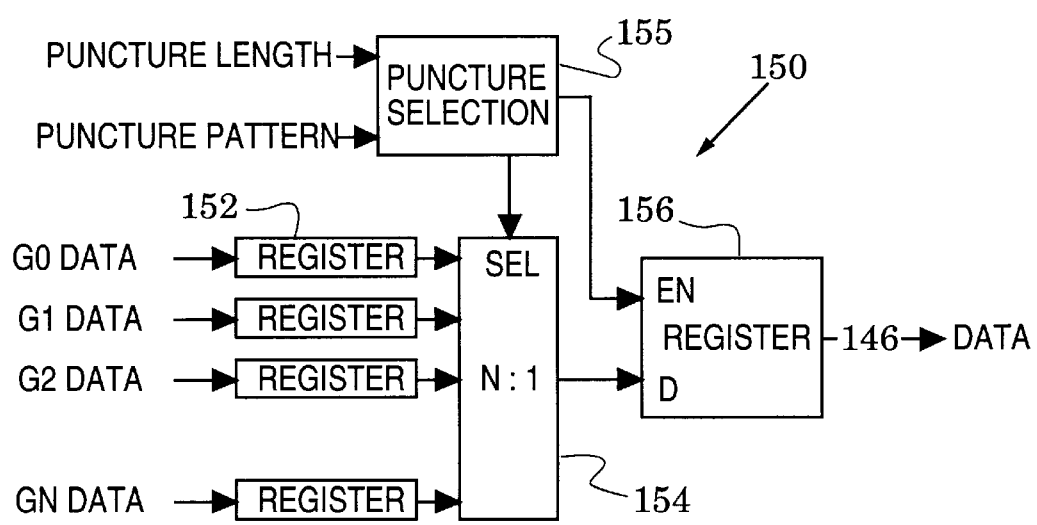
FIG. 6B is a block diagram of a code puncturer in accordance with the flow diagram of FIG. 6A.

Operation of the convolutional encoder is illustrated in the flow diagram 120 of FIG. 5A in which the incoming data 22 is time shifted in step 124. A set of N polynomial vectors is provided in process step 126 and added modulo-2 with the time-shifted data in process step 128.

An exemplary convolutional encoder 130 is shown in FIG. 5B. Data is received into a k-bit shift register 132 which generates an output bitstream 133 from the "exclusive-OR" of specific bits in the shift register. Modulo-2 adders 134 receive the bitstream 133 and n polynomial vectors to generate n separate, programmable data patterns and codes with rates of R=1/2 to R=1/n. An exemplary modulo-2 adder 134 is shown to have a serial combination of an AND gate 135 and a pair of excusive-OR's 136 and 137. The outputs of the adders 134 can seperately form the encoder data stream 109 (output of the encoder 42 in FIG. 2). Alternatively, they can be sequenced to form the encoder data stream. The encoder patterns and constraint length are programmable and easily expandable to allow for the use of any 1/n code of constraint length k.

Operation of the code puncturer is illustrated in flow diagram 140 of FIG. 6A in which process step 144 periodically drops data samples from the convolutionally encoded data stream 142 to generate punctured data 146. The dropping pattern and period is preferably programmable.

An exemplary code puncturer 150 is shown in FIG. 6B. It includes a series of registers 152 which receive the convoluted code from the convolution encoder 130 of FIG. 5B. These registers are coupled to a digital switch 154. Puncture length and pattern are selected in selection logic 155 and used to selectively pass data inputs through the switch 154 and to clock selected data 146 out of a flip-flop register 156.

Figure 7A:
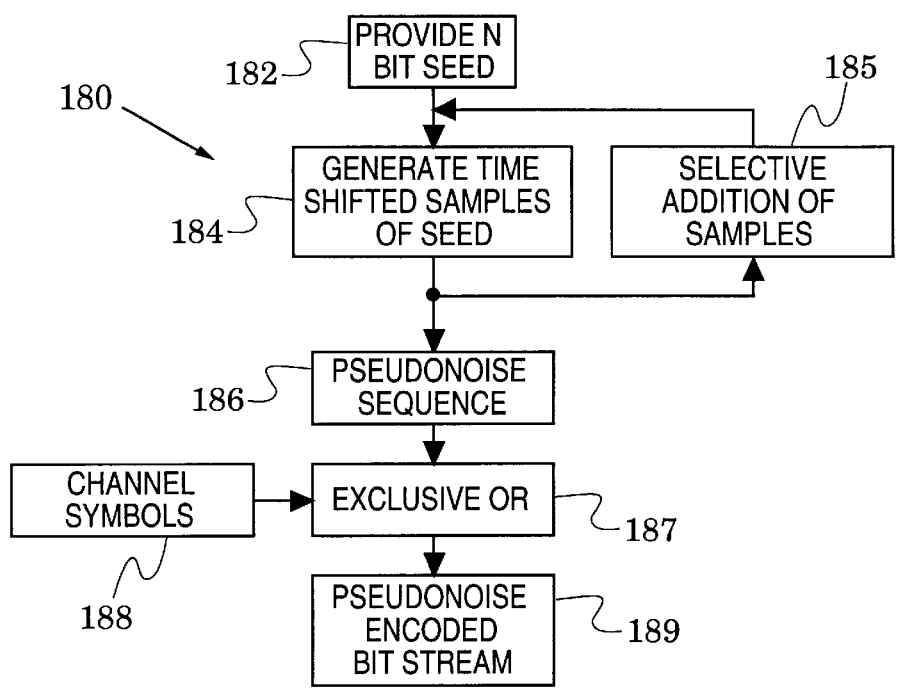
FIG. 7A is a flow diagram which illustrates operational steps of a pseudonoise generator and spreader in the transmit section of FIG. 2.

The CSP modulator 40 is structured to take advantage of spread spectrum modulation techniques. In particular, a direct sequence spread spectrum can be generated for code division multiple access systems with a pseudonoise spreader 190 and a pseudonoise generator 192. Operation of these modules is shown in the flow diagram 180 of FIG. 7A.

An N bit seed is provided in process step 182 and this seed is time shifted in step 184. Selected ones of these time-shifted samples are added and fed back in feedback step 185 to generate various pseudonoise spectrums 186 (e.g., m-sequences, Gold-sequences, Kasami-sequences and Walsh-sequences). The pseudonoise spectrum is exclusive OR'd in process step 187 with the channel symbols 188 (from the bit formatter 220 of FIG. 2) to form the direct sequence pseudonoise (DSPN) encoded bit stream 189.

Figure 7B:
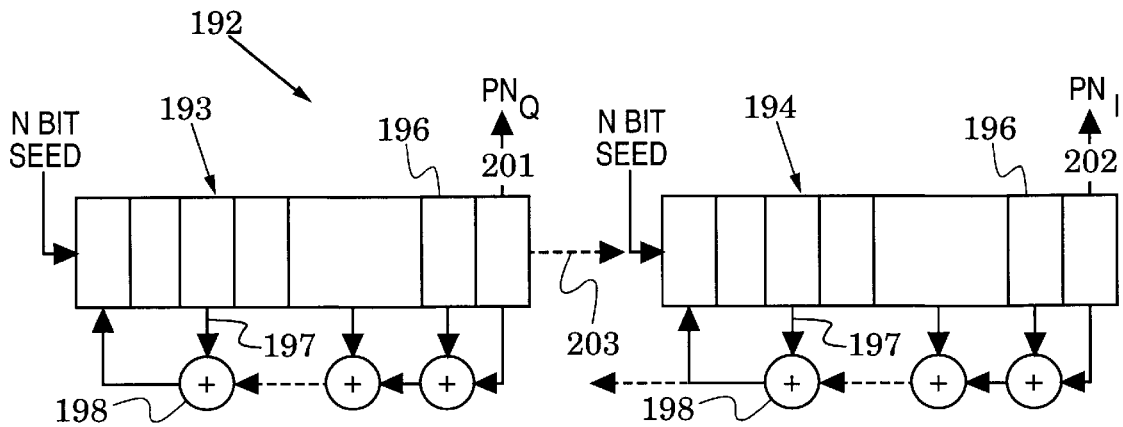
FIG. 7B is a block diagram of a pseudonoise generator in accordance with the flow diagram of FIG. 7A.

As shown in FIG. 7B, an exemplary pseudonoise generator 192 includes linear sequence generators 193 and 194. Each of these generators time shifts an N bit seed through a shift register 196 of length N. Selected taps 197 along the registers are added in adders 198 and fed back to the input of the register. The linear sequence generators 193 and 194 respectively generate Q and I pseudonoise sequences 201 and 202 which are input to the pseudonoise spreader (190 in FIG. 2). Alternatively, the generators 193 and 194 can be concatenated by applying the Q pseudonoise sequence 201 as the seed for the linear sequence generator 194 as indicated by the broken line 203. Essentially this forms a shift register of length 2N to generate a single pseudonoise sequence.

Figure 7C:
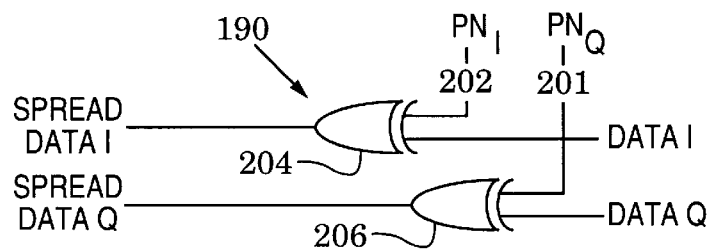
FIG. 7C is a block diagram of a pseudonoise spreader in accordance with the flow diagram of FIG. 7A.

As shown in FIG. 7C, an exemplary pseudonoise spreader 190 is simply a pair of exclusive OR circuits 204 and 206 which receive data streams and pseudonoise sequences and generate the pseudonoise encoded data streams. The pseudonoise generator 192 and the pseudonoise spreader 190 convert the data stream 22 into a direct sequence spread spectrum.

FIG. 2 illustrates a bit formatter 220 which is positioned between the encoder 42 and the pseudonoise spreader 190. For different selected modulation processes, the formatter 220 may divide the bit data stream 22 into I and Q data streams, define bit symbols and insert bits to identify data sources.

For example, if QPSK is the selected modulation process, the formatter 220 divides the data stream 22 into I and Q (in-phase and quadrature) data streams 222 and 224. Typically, this division is done by successively assigning alternate bits to the data streams 222 and 224 (e.g., bits 1, 3, 5 - - - 13 are assigned to the I data stream 222 and bits 2, 4, 6 - - - are assigned to the Q data stream 224). In this example, the formatter 220 identifies symbols wherein each symbol includes one data bit in each of the data streams 222 and 224. Thus the symbol duration is twice the bit duration.

If BPSK is the selected modulation process, the formatter 220 simply passes the data stream 22 on as the I data stream 222, the symbol duration substantially equals the bit duration and the Q data stream 224 does not carry any data (e.g., it is set to zero).

As a final example, if 8-ary PSK is the selected modulation process, the formatter 220 divides the data stream 22 into three data streams; the data streams 222 and 224 and a third data stream 226 shown in broken lines. In this modulation process, the symbol duration is three times the bit duration.

The data stream 22 may be coming from a plurality of sources (e.g., voice, facsimile and video). Data bursts from these different sources may be interleaved in the formatter 220 and identified by inserting identification bits 227 into a preamble of each interleaved burst.

With reference to FIG. 2, the encoder 42 converts the input data stream 22 into an encoded data stream 109. In response to this encoded data stream 109, the bit formatter 220 forms one or more data streams 222, 224 and 226 (in which streams, symbol durations may equal the bit duration, be twice the bit duration or be three times the bit duration). The pseudonoise generator 192 forms I and Q pseudonoise sequences 201 and 202. If the data streams are to be spread, the outputs 230 and 232 of the pseudonoise spreader are the product of the data streams and the pseudonoise chip streams 201 and 202 (a chip is a bit of the pseudonoise sequence). Otherwise the outputs 230 and 232 simply carry the outputs of the formatter 220.

The CSP transmit section 40 of FIG. 2 includes a common phase modulator 44 and a direct I/Q modulator 46. For some simple modulation waveforms such as BPSK, DPSK, QPSK and SQPSK, the input data bit stream 22 can be converted directly in the direct I/Q modulator 46 into the output baseband I and Q channels 24. External to the CSP (20 in FIG. 1), the output baseband I and Q signals 24 are typically used to modulate carrier signals into M carrier phases. In BPSK, M=2 and a symbol consists of a single bit of the data stream d(t) 22. In QPSK, M=4 and a symbol consists of a bit pair of the data stream d(t) 22.

Figures 8, 9:
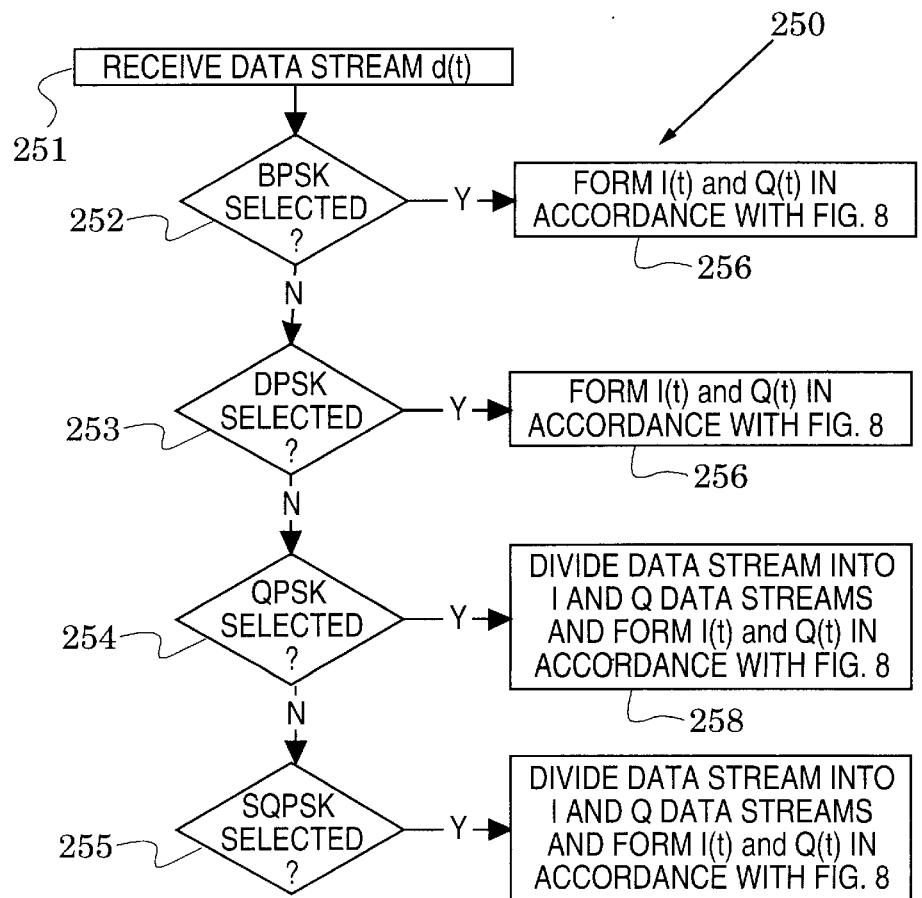
FIG. 8 is a table which specifies direct conversion of an input data stream d(t) into output baseband in-phase and quadrature signals I(t) and Q(t) for selected modulation processes.
FIG. 9 is a flow diagram which illustrates the process steps of FIG. 8 in a direct I/Q modulator of the transmit section of FIG. 2.

The modulation which is performed downstream from the transmit section 40 can be expressed as $$s(t)=I(t)\cos(2\pi ft+\phi)+Q(t)\sin(2\pi ft+\phi), \quad (1)$$

in which I(t) and Q(t) are the in-phase and quadrature signals 24 generated by the CSP transmit section 40, f is a modulation frequency and $\phi$ is an arbitrary phase. The table 240 of FIG. 8 illustrates the conversion in the direct I/Q modulator 46 of the input data stream d(t) 22 into I(t) and Q(t) signals 24 for various modulation processes. Table 240 shows that the bits of the data streams d(t), $d_i(t)$ and $d_q(t)$ are preferably set equal to ±1 before formation of the baseband I(t) and Q(t) signals 24.

For BPSK, Q(t) is simply set to zero and I(t) is set equal to the data stream d(t) 22. DPSK is similar to BPSK. In DPSK, Q(t) is again set to zero but I(t) is set equal to a data stream that is formed by multiplying the input data stream d(t) by a sample of the data stream that is delayed by one symbol time $T_{s1}$ (this symbol time $T_{s1}$ is a single bit of the data stream d(t) in BPSK). In DPSK, therefore, I(t)=d(t)d(t-$T_{s1}$) and Q(t)=0. DPSK is useful because its integration of the data stream facilitates the use of a noncoherent receiver.

For QPSK, the input data stream d(t) 22 is divided into two data streams $d_i(t)$ and $d_q(t)$. Then I(t) is set equal to $d_i(t)$ and Q(t) is set equal to $d_q(t)$. SQPSK is similar to QPSK but the data stream is delayed by half a symbol time $T_{s2}$ (this symbol time $T_{s2}$ is a bit pair of the data stream d (t) in QPSK and SQPSK). This delay is performed with a half symbol delay 242 shown in the direct I/Q modulator 46 of FIG. 2.

In SQPSK, therefore I(t)=$d_i(t)$ and Q(t)=$d_q$(t-$T_{s2}$/2). In accordance with equation (1), QPSK has four phase states which are separated by $\pi$/2. Phase changes occur simultaneously in the baseband I and Q signals 24 and the maximum state change can therefore be $\pi$/2. Because of the offset between its in-phase and quadrature signals, SQPSK has only one phase transition at a time and the maximum phase state change in equation (1) is $\pi$/2 (i.e., there is never a $\pi$ change of states). Because of this limited phase change, filter SQPSK facilitates the use of nonlinear amplifiers in the downstream signal modulation of this process.

To facilitate the modulation process of equation (1) downstream from the CSP (20 in FIG. 1), it is desirable to sample the data stream at a sampling rate which is substantially four time the symbol rate $R_s$ ($R_s$ is the inverse of the symbol time $T_s$) for non-spread waveforms. When the pseudonoise generator 192 and pseudonoise spreader 190 of the transmit section 40 of FIG. 2 are used to multiply the input data stream d(t) 22 and create a spread spectrum, the sampling rate is preferably twice the chip rate of the pseudonoise sequence. This increased sampling rate is obtained in samplers 244 of the direct I/Q modulator 46.

The modulation process of the direct I/Q modulator 46 is further illustrated in the flow chart 250 of FIG. 9. After the data stream d(t) is received in process step 251, the decision steps 252–255 decide which of the modulation processes of BPSK, DPSK, QPSK and SQPSK has been selected. For each selected modulation process, the direct I/Q modulator (46 in FIG. 2) forms the baseband in-phase and quadrature signals I(t) and Q(t) (24 in FIG. 2) in accordance with table 240 of FIG. 8 as specified in process steps 256–259 of the flow chart 250.

The processes of FIGS. 8 and 9 are preferably implemented with the aid of a computer 260 which is coupled to the direct I/Q modulator 46 as shown in FIG. 2 and which is programmed in accordance with the flow chart 250 of FIG. 9 and the table 240 of FIG. 8. The computer 260 is preferably a microprocessor and an exemplary microprocessor for this use is a Texas Instruments TMS3200C40 processor.

The common phase modulator 44 of the CSP transmit section 40 includes a bit to phase encoder 270 and a cos/sin look-up table 272. Coupled between these elements are a first path 274 having a sampler 244, a second path 276 having a series arrangement of a sampler 244 and a symbol phase integrator 278 and a third path 280 having a serial arrangement of a sampler 244 and a frequency integrator 282.

The common phase modulator 44 also has a fourth path 286 to the sin/cos look-up table 272. This path includes a serial arrangement of a sampler 244, a half symbol delay 242, a bit to phase encoder 290 (similar to the bit to phase encoder 270) and a phase shaper 292. This fourth path 286 is coupled between the sin/cos look-up table 272 and the pseudonoise spreader 190.

As stated above, the output baseband I and Q signals 24 are typically used downstream of the CSP (20 in FIG. 1) to modulate carrier signals into M carrier phases. In a modulation process such as BPSK, M=2 and a symbol consists of a single bit of the data stream 22. In a modulation process such as QPSK, M=4 and a symbol consists of a bit pair $(d_i,dq)$ of the data stream d(t) 22. In a modulation process such as 8-ary PSK, M=4 and a symbol consists of three bits $(d_1,d_2,d_2)$ of the data stream 22. As also stated above, the downstream modulation can be expressed as equation (1) above.

The modulation processes of the common phase modulator 44 are specified in table 300 of FIG. 10. The right hand column of table 300 of FIG. 10 specifies that a code is used to convert the data stream to a phase stream. This conversion yields a phase stream q(t) as shown in the middle column of table 300. Finally, the baseband output I/Q signals (24 in FIGS. 1 and 2) are obtained by the the expressions $$I(t)=\cos(\theta(t)) \text{ and} \quad (2)$$

$$Q(t)=\sin(\theta(t)). \quad (3)$$

The waveforms that can be generated by the common phase modulator 44 are BPSK, DPSK, Shaped BPSK, QPSK, π/4-DQPSK, Offset-QPSK, Shaped Offset QPSK, M-ary FSK and MSK.

Preferably, the code used to convert the data stream into a phase stream is a gray code because this reduces errors resulting from adjacent phase states. For example, an error between adjacent phase states will cause an error in only one of data streams $d_i(t)$, $d_q(t)$.

An exemplary gray code for use in modulation processes such as BPSK is shown in table 302 of FIG. 11A. An exemplary gray code for use in modulation processes such as QPSK is shown in table 304 of FIG. 11B. Finally, an exemplary gray code for use in modulation processes such as 8-ary PSK and 8-ary FSK is shown in table 306 of FIG. 11C.

Figure 12A:
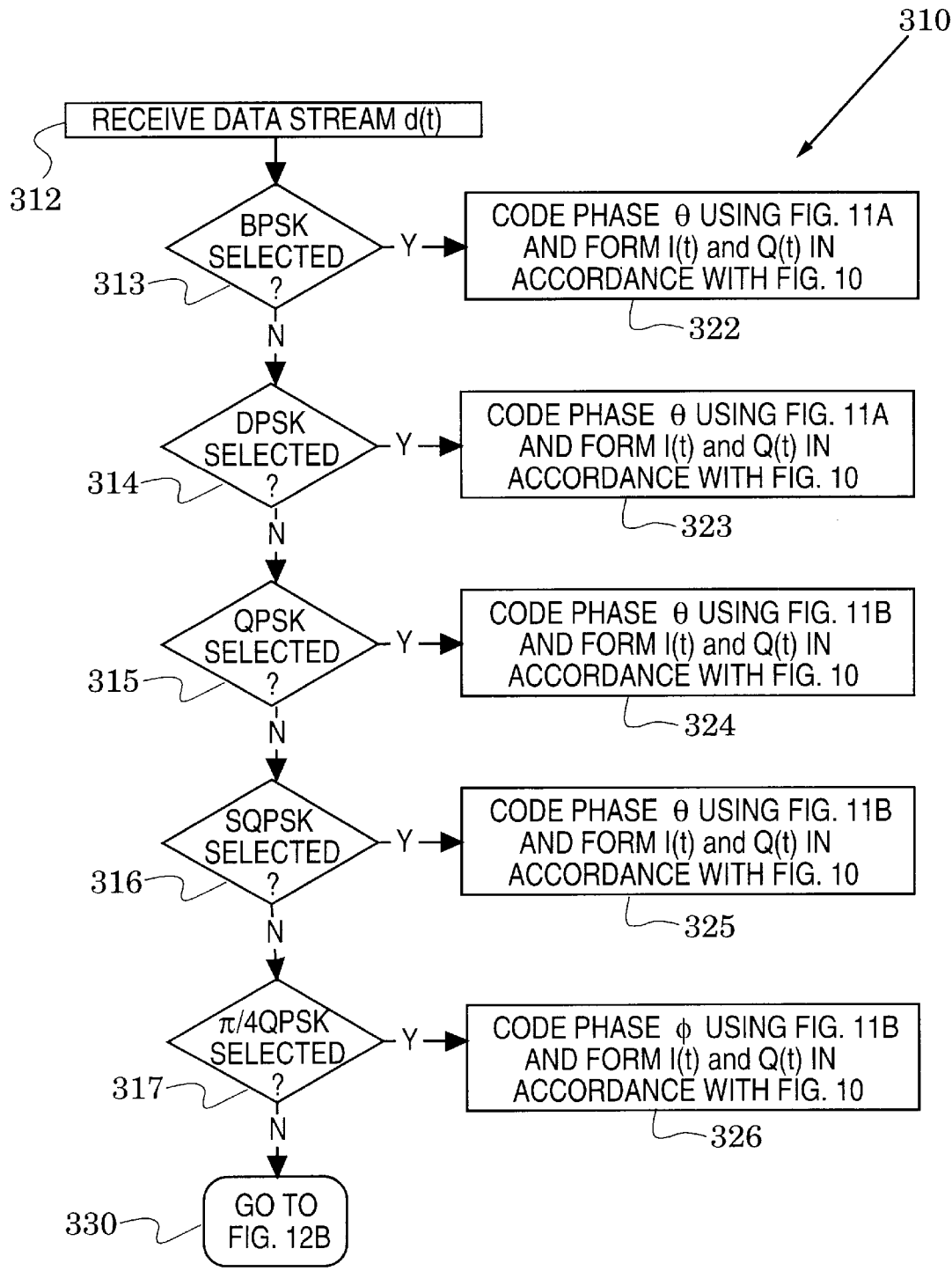
FIGS. 12A and 12B form a flow diagram which illustrates the process steps of FIG. 8 in a direct I/Q modulator of the transmit section of FIG. 2.
Figure 12B:
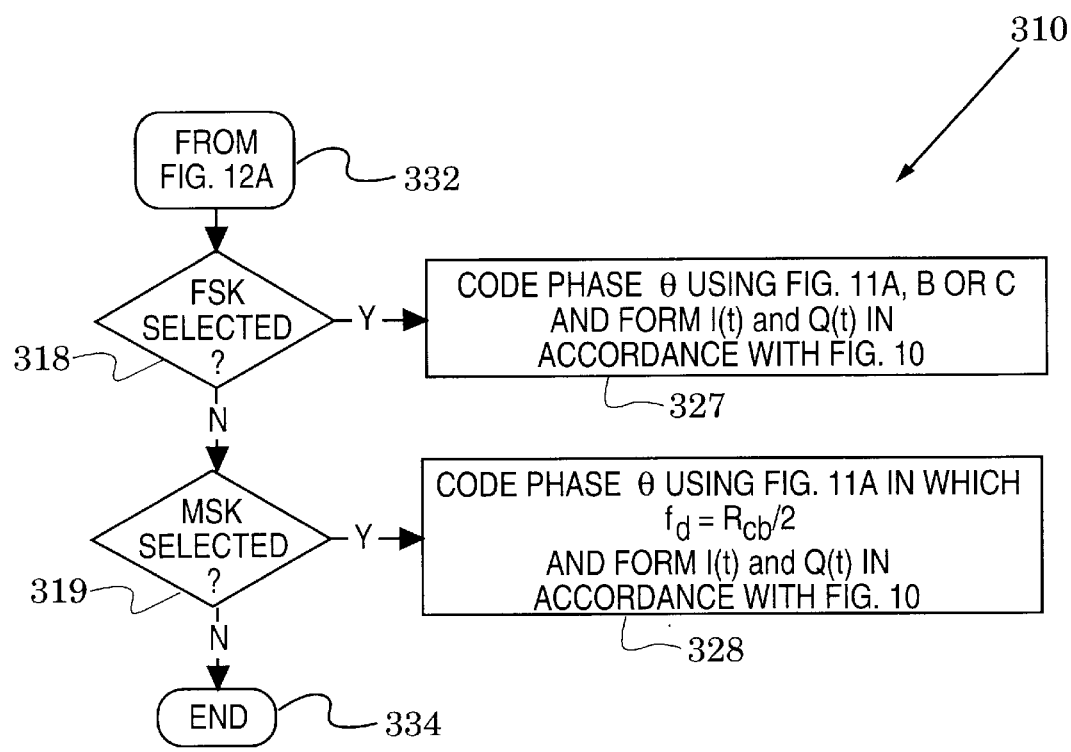

A flow chart 310 is shown in FIGS. 12A and 12B which illustrates the processes used in the common phase modulator 44 to convert the data stream 22 to phase streams θ(t) that are then applied to the cos/sin look-up table 272 to obtain the baseband I and Q signals (24 in FIG. 2).

After the data stream d(t) is received in process step 312, the decision steps 313–319 decide which of the modulation processes of table 300 of FIG. 10 has been selected. For each selected modulation process, the common phase modulator (44 in FIG. 2) forms the baseband in-phase and quadrature signals I(t) and Q(t) (24 in FIG. 2) in accordance with table 300 of FIG. 10 as specified by process steps 322–328 of FIGS. 12A and 12B. The flow charts of FIGS. 12A and 12B are connected by terminators 330 and 332 and ends with terminator 334. Preferably, gray codes such as those of tables 302, 304 and 306 of FIGS. 11A–11C are used to convert the data stream to a phase stream prior to application of the phase stream to the sin/cos look-up table (272 in FIG. 2).

In the conversion processes of FIGS. 10 and 12A–B, the symbol phase integrator 278 of FIG. 2 integrates the phase for differential phase modulation, such as DPSK or π/4-DQPSK. The symbol's phase is sampled at the symbol rate Rs, and then integrated to produce the accumulated phase before converting to I and Q components with the sine and cosine look-up table 272. The integration rate is one per data symbol.

The frequency integrator 282 integrates frequency to produce the phase for frequency modulation such as MSK or M-ary FSK. The symbol's frequency is sampled at a rate kRs.

In the path 286, the half symbol delay 242 provides the delay of one data stream necessary to generate offset modulations such as OQPSK. The phase shaper uses a window integrator filter with a duration of $T_w$ to smooth the phase transitions for different phase modulation waveforms, such as Shaped BPSK (SBPSK) and Shaped Offset QPSK (SOQPSK).

When employed with a phase modulated waveform, this filter provides a linear phase transition over a period of $T_w$ when there is a phase change. Everywhere else, the phase is the same as the original phase.

The processes of FIGS. 10, 11A–11C and 12A–12B are preferably implemented with the aid of the computer 260 of FIG. 2 which is coupled to the common phase modulator 44 and which is programmed in accordance with the flow chart 310 of FIG. 12A and 12B and the tables 300, 302, 304 and 306 of FIGS. 10 and 11A–11C.

In many applications, the sample rate of common phase modulator 44 may not be synchronous to a clock of a downstream tuner which uses the baseband I and Q signals 24 to modulate carrier signals. Therefore the I and Q samples must be processed with the signal resampler 48 to convert them to the sampling rate required by the tuner. The signal resampler 48 preferably uses an interpolation process. When the baseband I and Q signals 24 are oversampled 4 times or more, the error due to interpolation is negligible.

Attention is now directed to a detailed description of the CSP receive section 60 of FIG. 3. The input baseband I and Q signals 26 are typically received from a conversion device, e.g., a digital tuner, which converts wideband IF signals into the baseband in-phase and quadrature signals I (t) and Q(t) 26 at a desired decimated sampling rate. These sampling rates are preferably about four times the symbol rate for non-spread waveforms and about twice the chip rate for PN spread spectrum waveforms.

Figure 13:
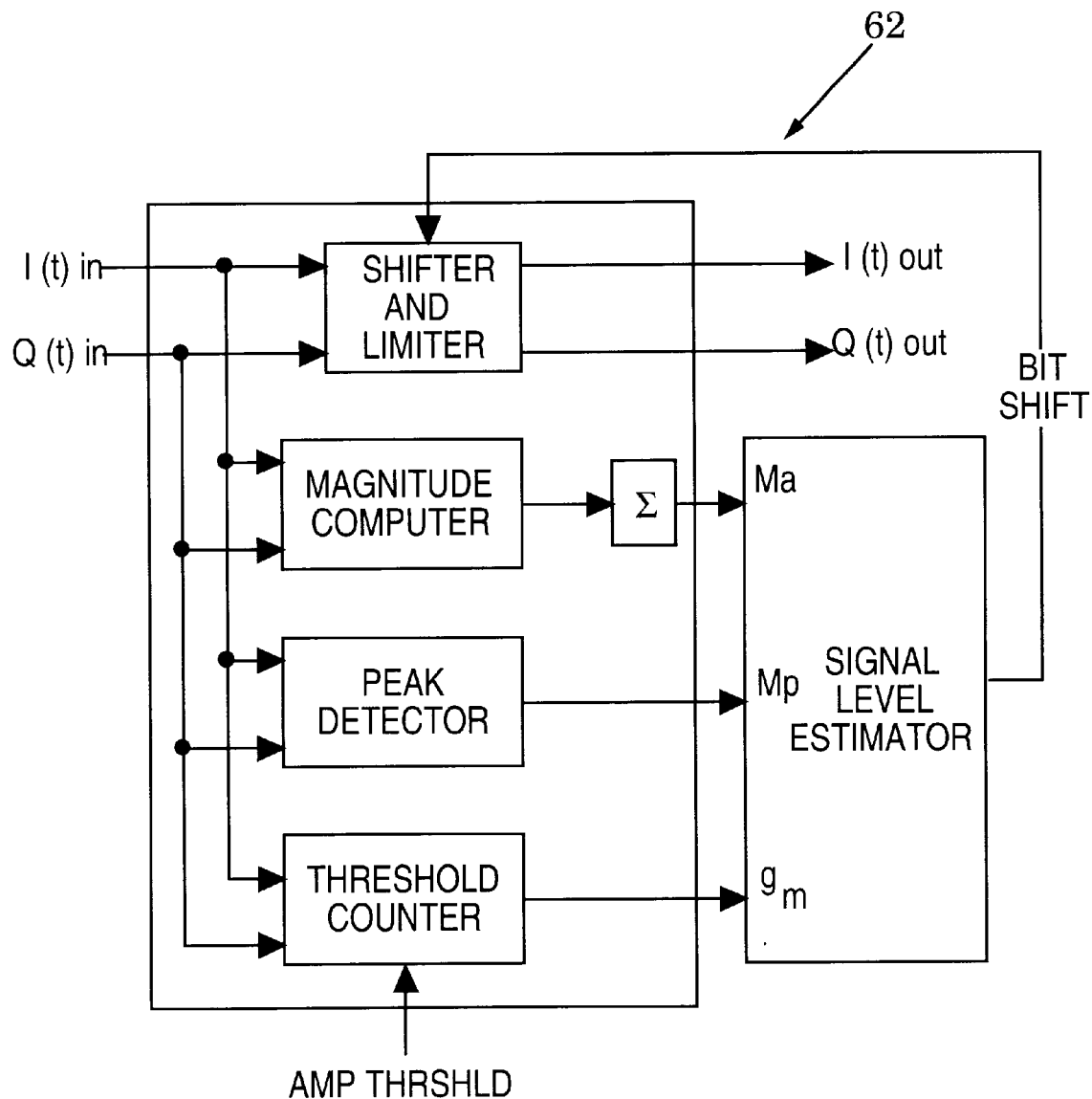
FIG. 13 is a block diagram of a gain controller in the receive section of FIG. 3.

The gain controller 62 adjusts the input signal level of the baseband I and Q signals 26 to avoid signal saturation and maximize signal dynamics. As shown in FIG. 13, the gain controller processes the I and Q signals 26 and estimates the baseband signal peak amplitude, amplitude average, and the probability that the signal amplitude will exceed a specified threshold. These parameters are read and processed (e.g., by the computer 260 of FIG. 3) to compare the received signal amplitude with precomputed ideal amplitude levels to determine the number of bits to shift.

The number of bits to shift are then written back to the gain controller 62 to scale and limit the I and Q signals (each bit shift indicates a 6 dB change in the signal amplitude). A finer gain adjustment can be achieved in either the DSP or Digital Tuner for AGC operation. The gain controller 62 also includes a 2 bit quantizer which generates 2 bits based on a combination of a zero crossing detector and a programmable threshold detector. This quantizer can be used for spread spectrum signals which are corrupted by a sinusoidal signal.

For high efficiency in the demodulation process, it is desirable to demodulate and track at a sampling rate which is four times the symbol rate (Rs) for non-spread waveforms and twice (or four times) the chip rate (Rc) for direct sequence pseudonoise (DSPN) waveforms. Hence the received samples are preferably converted to the proper sampling rate with the signal resampler 64. The signal resampler uses a linear interpolation technique to compute the samples so that any sample at $t_{out}$ is surrounded by two adjacent samples at $t_{in}$.

Figure 14:
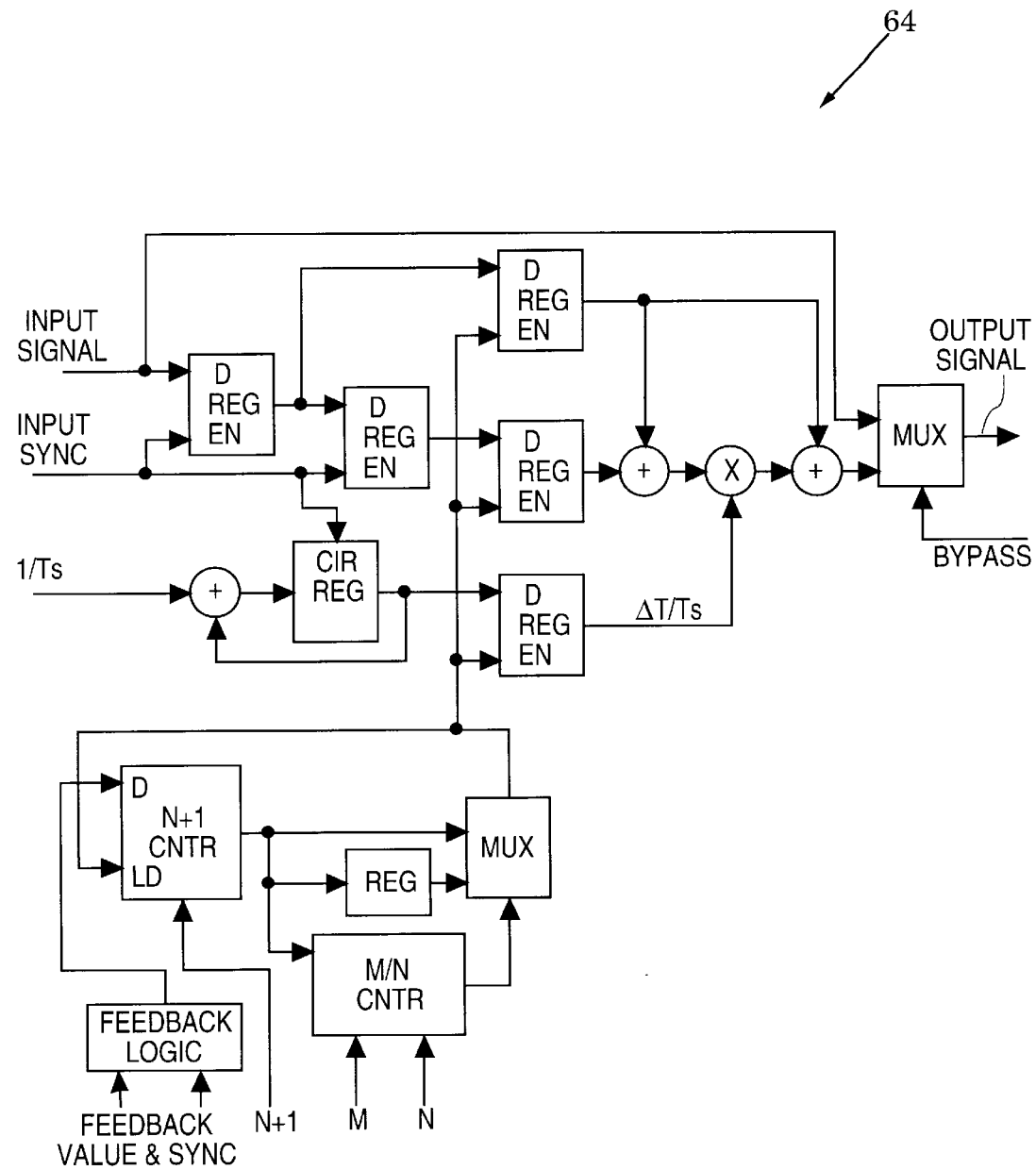
FIG. 14 is a block diagram of a signal resampler in the receive section of FIG. 3.

As illustrated in FIG. 14, the signal resampler 64 uses a combination of a 1/k counter and a m/n counter to generate an output data rate which is not a integer of a system clock rate. The 1/k counter is necessary for data alignment because of its ability to be initialized with any time offset. The m/n counter allows for non-integral clock rates by causing the 1/k counter to become a 1/(k+1) counter m times in n+m cycles. Therefore the output rate will average n cycles of k clocks plus m cycles of k+1 clocks.

Figure 15:
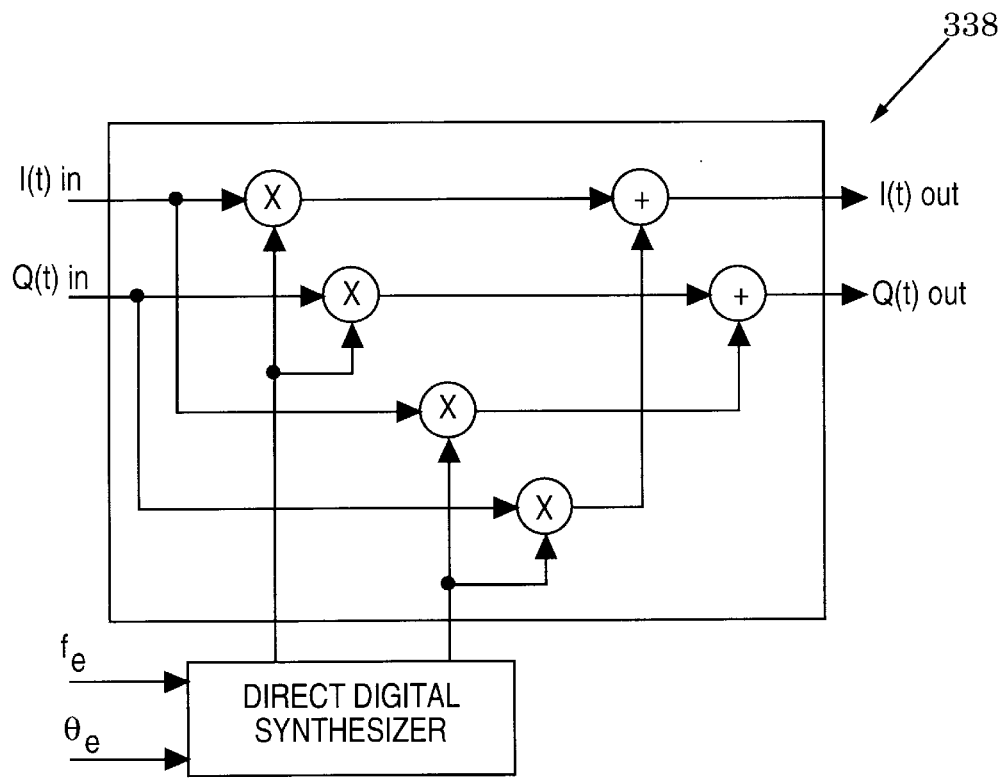
FIG. 15 is a block diagram of a signal multiplier in the receive section of FIG. 3.

Because of the characteristics of upstream receiver structures, e.g., a digital tuner, the baseband I and Q signals may not be centered at DC. This frequency offset can degrade the performance of the CSP receive section 60. during the signal integration process. Accordingly, a signal multiplier 338 is shown in FIG. 15 which includes four multipliers which can shift; the phase and frequency of the input signals. Required sine and cosine waveforms are generated by a direct digital synthesizer (DDS) based on a frequency word $f_e$ and a phase word $\theta_e$ which are indicative of the frequency and phase offsets respectively. This process, in effect, corrects for the frequency and phase errors and locks the receive section 60 to the incoming signal. The signal multiplier is preferably positioned serially with the gain controller 62 and signal resampler 64. In FIG. 3, the signal multiplier 338 is accordingly indicated (in broken lines) between these two modules.

A half symbol delay 339 is serially arranged with the signal resampler. This provides a delay of $T_s/2$ when the modulation process is an offset process, e.g., SQPSK.

Figure 16:
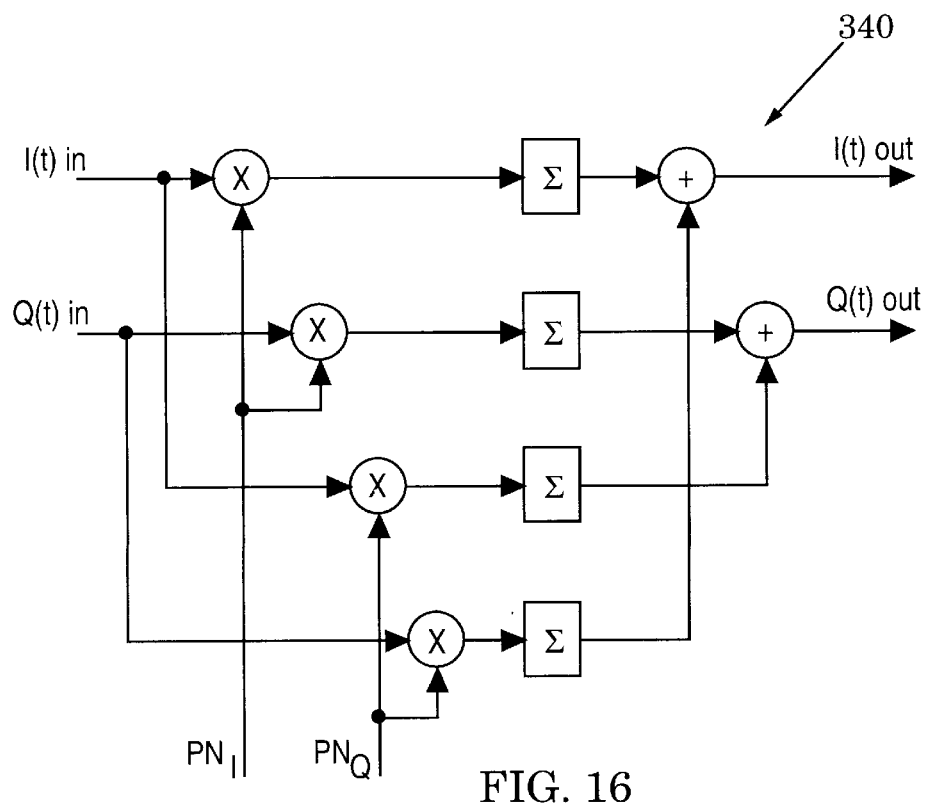
FIG. 16 is a block diagram of a pseudonoise despreader in the receive section of FIG. 3.

The CSP receive section 60 of FIG. 3 includes a pseudonoise despreader 340 which receives a pseudonoise sequence from a pseudonoise generator 342. The pseudonoise despreader 340 can be used to despread DSPN waveforms with baseband I and Q signals that were formed with MSK or BPSK modulation processes. This despreading is essentially a correlation process which is obtained by multiplying the received samples with the pseudonoise sequence and integrating the result over channel bit or channel symbol time. Despreading is performed for early, on-time, and late samples. The structural details of the pseudonoise despreader 340 are shown in FIG. 16.

Figure 17:
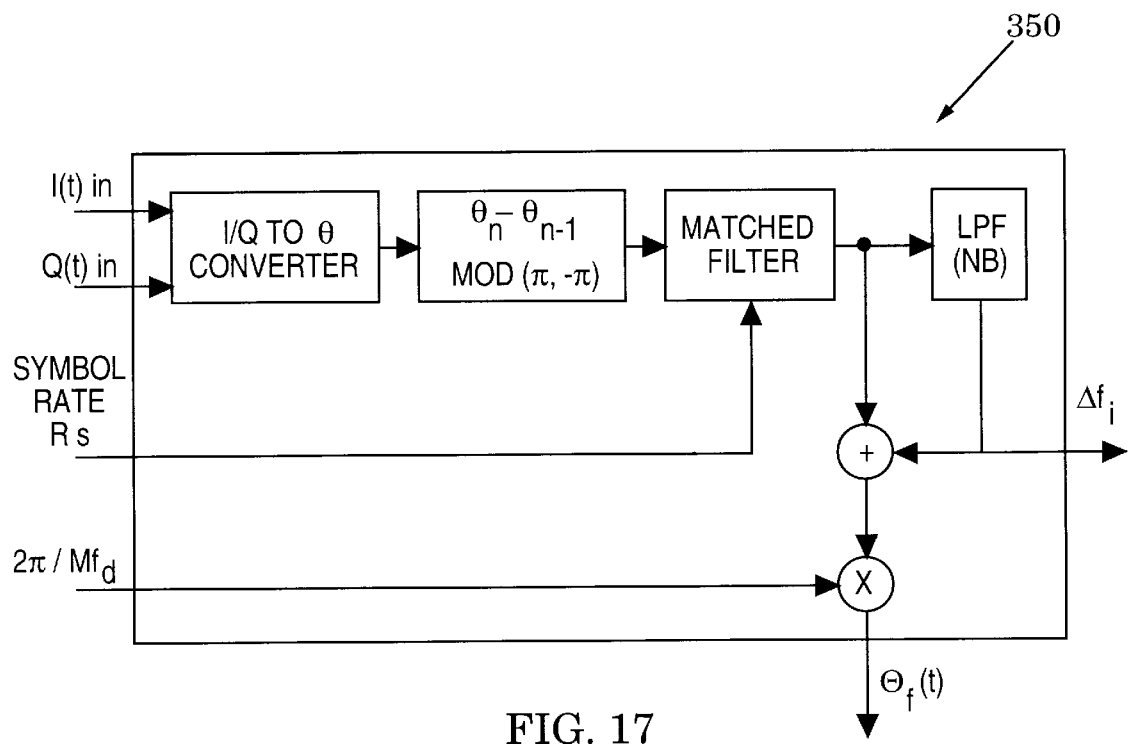
FIG. 17 is a block diagram of an FSK to PSK converter in the receive section of FIG. 3.

The CSP receive section 60 also includes an FSK to PSK converter 350 which is shown in detail in FIG. 17. This converter 350 converts M-ary FSK waveform into the phase domain so that the data can be time-tracked, frequency-tracked and soft demodulated by the common phase demodulator 72.

The input on-time sample pair, I(k) and Q(k) forms a complex signal and the phase of this signal is extracted via an arctangent function or look-up table to obtain a phase F(k). This phase is then differentiated, yielding the modulated frequency signal with M levels where M is the size of the frequency alphabet and also yielding the frequency spacing $f_d$. The frequency remains constant over symbol durations.

To increase the demodulation SNR, this signal is match filtered (averaged over a window length Ts) to yield a matched frequency signal. Use of the common phase and frequency offset estimator and demodulator is facilitated by scaling the matched filter output by $2\pi/$ Mfd to convert the frequencies into "phases" that are equally distributed over $[0, 2\pi]$.

Ideally, the resulting waveform has a zero-mean, but typically the received signal will have a frequency offset. To estimate the frequency offset, a narrowband lowpass filter is used to estimate the mean of the waveform, and the receiver removes this offset from Ff(tk) to correct the frequency at the tuner. In time, a phase $\Phi_f(t_k)$ has zero mean. For M=4, this signal is similar to QPSK, but for M=2 or 8, the waveform has a shifted phase constellation relative to BPSK and 8PSK. The phase signal is fed into the time offset estimator 70, the phase and frequency offset estimator 68 and the common phase demodulator 72 to extract the time offset, frequency offset and output bit stream d(t) respectively.

Figure 18:
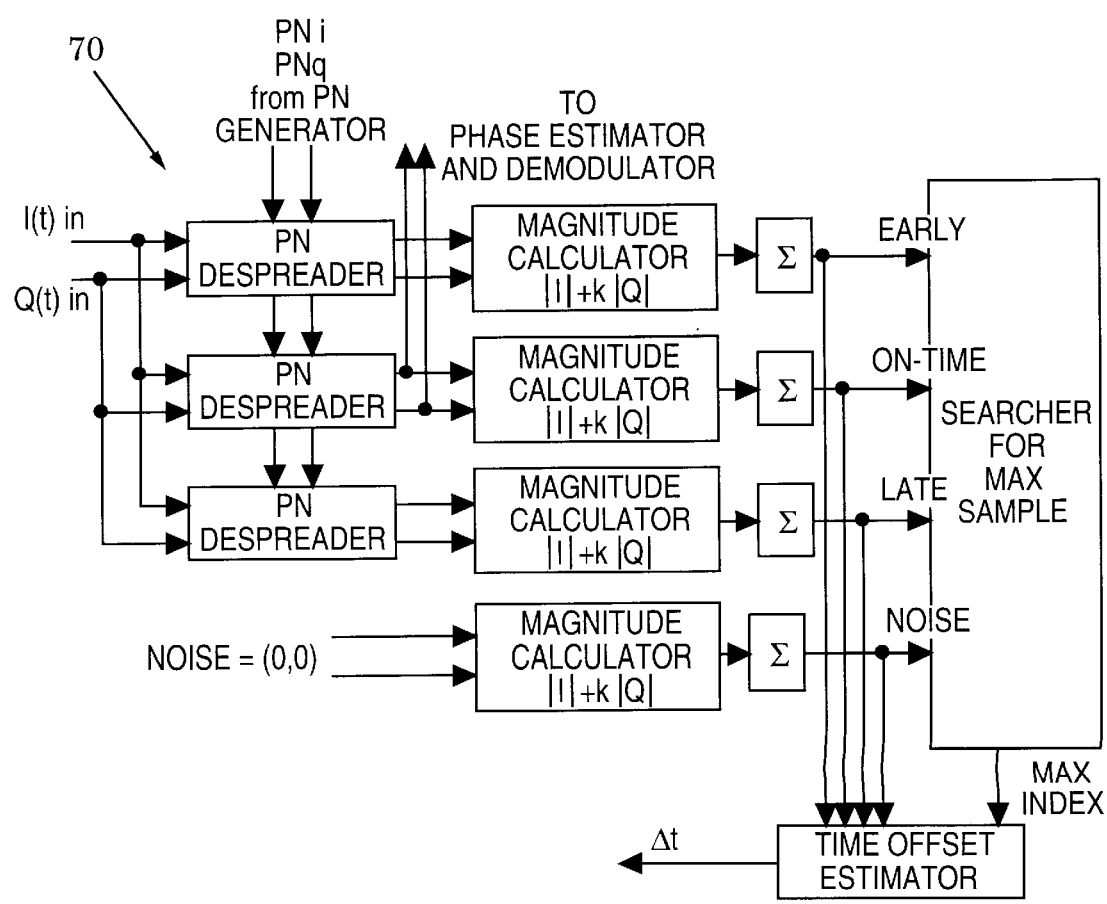
FIG. 18 is a block diagram of a time estimator in the receive section of FIG. 3.

The time estimator 70 of the CPS receive section 60 measures sample timing offsets and communicates them to the signal resampler 64 or system controller for time adjustment. This facilitates time-alignment with the incoming signal's timing and maximizes the demodulated SNR. In particular, the time estimator exploits the early, on-time and late samples to identify an obscure peak time. The modulation processes which can be used with the time estimator 70 include MSK, BPSK, QPSK, SQPSK, M-ary FSK, DPSK, DQPSK, and $\pi/4$-DQPSK. The details of the time estimator 70 are shown in FIG. 18.

For non-spread waveforms, the received signal is preferably sampled at four times the symbol rate, and the sample sequence arranged to show four samples per symbol. These samples are early samples ($x_{i1}$), on-time samples ($x_{i2}$), late samples ($x_{i3}$) and "noise" samples ($x_{i4}$). A term $Y_{ij}$ is integrated over $N_{tt}$ symbols to increase the SNR and obtain four samples A1=sumYi1, A2=sumYi2, A3=sumYi3 and A4=sumYi4 in which $Y_{ij}=|\text{Real}\ (x_{ij})|$ for MSK, BPSK and M-ary FSK, $Y_{ij}=|\text{Real}\ (x_{ij})|+|\text{Imag}\ (x_{ij})|$ for QPSK and SQPSK and $Y_{ij}=|x_{ij}|\text{Real}\ (x_{ij})|+\gamma|\text{Imag}\ (x_{ij})|$ for $\pi/4$QPSK.

Figure 19:
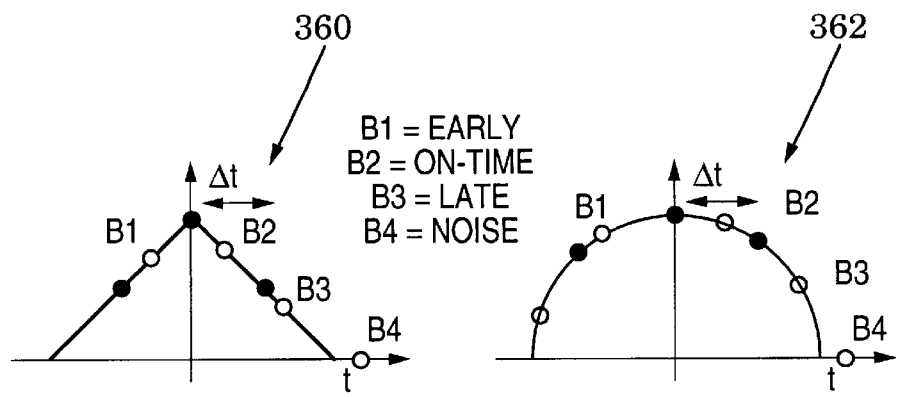
FIG. 19 is a diagram of sample amplitude distributions in the time estimator of FIG. 18.

An index k of the sample with maximum amplitude is found and the four samples are then circularly shifted by k−2 samples to form samples B1,B2,B3,B4) as shown in FIG. 19. Since B2 is the largest sample, the three samples B1,B2 and B3 form a parabola 362 centered about the true peak as illustrated in FIG. 19.

The time offset is expressed as $$\Delta t/T_s = (k-2)(T_s/4) + \frac{1}{4}\{(B1-B3)/(2B2-(B1+B3))\}$$

In practice, the denominator is proportional to B2 so that a simpler tracking algorithm is $\Delta t/T_s = (k-2)(1/4) + \alpha\{(B1-B3)/B2\}$ in which ($\alpha$ is a selected parameter that depends upon the signal amplitude shape.

In the case of DSPN waveforms, the despreading samples can be used to compute the time offset. The received signal is sampled at twice the chip rate and three despreading outputs (i.e. early by half-a-chip, on-time and late by half-a-chip) are computed using the summers of FIG. 18. The despreading can be computed and coherently, or non-coherently, combined. The three samples B1,B2 and B3 form a triangle 360 with B2 being the closest to the peak as shown in FIG. 19.

The three samples are used along with the index k to estimate the time shift as $\Delta t/T_c = (k=2)(1/4) + \{(B1-B3)/(2B2+|B1-B3|)\}$ which can be approximated as $\Delta t/T_c = (k-2)(1/4) + \alpha\{(B1-B3)/B2\}$.

The time offset is extracted and reported to the resampler (64 in FIG. 3) to adjust the timing to match the on-time sample.

The estimated time offset $\Delta t$ may fluctuate about its mean. To improve the time offset estimation, a low pass filter (either IIR or FIR) can be used to filter $\Delta t$. For MSK waveforms, the phase offset indicates the amount of time offset. Thus the time offset must be extracted and compensated.

As shown in FIG. 3, the receive section 60 includes a phase look-up table 370 which facilitates conversion of the on-time I and Q signals (of phase modulated waveforms) to phase. The outputs are passed to the phase and frequency offset estimator 68 and the common phase demodulator 72.

The phase and frequency offset estimator 68 of FIG. 3 measures phase and frequency offsets to find phase and frequency corrections. This facilitates phase locking and frequency locking to the incoming signal to maximize the demodulated SNR. This process exploits the phase multiplier to remove the phase alphabet and form a single phase constellation for phase offset detection. The phase and frequency estimator 68 can be used with waveforms obtained from the modulation processes of MSK, BPSK, QPSK, SQPSK. In addition, frequency offsets of M-ary FSK can be estimated. The phase and frequency estimator 68 is not used with differential modulation processes such as DPSK, DQPSK, and π/4-DQPSK because there is no need for phase tracking.

Figure 20:
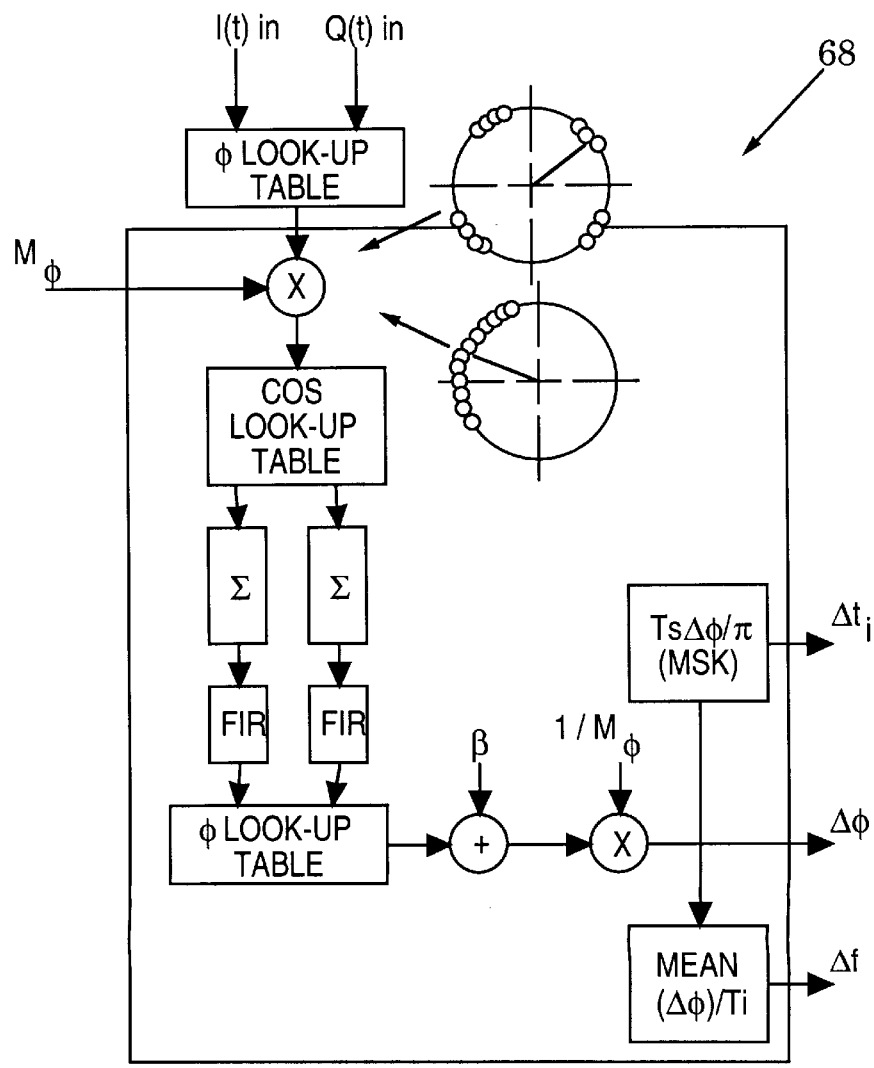
FIG. 20 is a block diagram of a phase and frequency offset estimator in the receive section of FIG. 3.

Details of the phase and frequency estimator 68 are shown in FIG. 20. At the input, without noise, the on-time samples pair, I(k) and Q(k), form a complex signal that can be expressed as $$s(k)=I(k)+jQ(k)=\exp(j(2\pi d/M\phi+\beta/M\phi+\Delta f(k)))$$

in which d=0, 1, . . . , Mφ−1 is a modulation phase word, and f(k) is a phase offset, which can be anywhere within [0, 2π]. The parameter β is a cooefficient that rotates the phase depending on the phase constellation (e.g., β=0 in MSK, BPSK and β=π in QPSK, OQPSK, M-ary FSK).

To estimate the phase offset, it is necessary to remove the modulation phases, and rotate to a 0° constellation. Thus s(k)=I(k)+jQ(k)=exp(j(φ(k))=exp(j(2πd/M$_{\phi+\beta/M100}$+Δf(k)) in which Φ)(k)=angle(I(k)+jQ(k)). Thus E{s$^{M\Phi}$(k)}=exp(j (β+M$_\phi$E{Δφ(k)}) and since M$_{\phi\Phi(k)=\beta+M\phi}$Δφ(k), then E[Δφ (k)] ={β+E[M$_\phi$φ(k)]}/M$_\phi$which equals $$\{\beta+\text{angle}\{E[\cos(M_\phi\phi(k))]+j\,E[\sin(M_\phi\phi(k))]\}\}M_\phi.$$

As shown in FIG. 20, the I and Q sample pair is first converted into phase via a look-up table. The phase sequence is then multiplied with a value Mφto remove the signal alphabet. The sine and cosine of the phase MφΦ((k) is then computed and integrated over N$_{\phi t}$ symbols to increase the SNR. If a higher SNR is desired, an FIR filter can be used. The integrated sine and cosine pair is then converted back to phase, which is the average of β+M$_{\phi\Phi}$(k). The phase β is removed from the above mentioned phase which is then divided by M$_\phi$ to extract the average phase offset E[φ(k)]. Note that β is zero for biphase modulation, and is equal to π for other aforementioned modulations.

The phase offset is extracted and reported to other front-end processors which may be associated with the CSP (20 in FIG. 1) (e.g., an RF mixer or a digital tuner) to align the phase to the phase constellation.

Residual frequency error causes the phase to walk over time. Once the phase offset is detected, the frequency offset can be determined as $$f_\phi=\{E[\Delta\phi(k)]\}/T_{in}$$

in which E[Δφ(k)] is the phase offset average and T$_{in}$ is the integration duration.

For M-ary FSK waveforms, the phase must be converted to frequency. If f$_d$ is the frequency spacing between FSK tones, the FSK frequency offset can be expressed as f$_{fsk}$= 2f$_d${(Δφ(k)/π}.

For MSK waveforms, the phase offset indicates the time offset. Thus the time offset must be extracted and compensated with the time offset from the time offset estimator (70 in FIG. 3) as Δ=Δt1+Δt2 in which Δt1 is the estimated time offset and Δt2 is {E[Δφ(k)]/π}/T$_s$.

The time estimates of the time estimator 70 and the frequency and phase estimates of the phase and frequency offset estimator 68 are preferably sent to upstream demodulating devices, e.g., a digital tuner, to enhance receiver alignment. This alignment facilitates soft demodulation of the output data stream d(t) 28 by the common phase demodulator 72.

The common phase demodulator 72 converts the signal phase or frequency into 3 bit soft demodulated data bits for waveforms associated with modulation processes that include BPSK, DPSK, Shaped BPSK, QPSK, π/4 DQPSK, Offset-QPSK, Shaped OQPSK, M-ary FSK and MSK. The common phase demodulator is applicable to DSPN, or nonspread waveforms and supports both phase or frequency modulated modulation processes.

Figure 21:
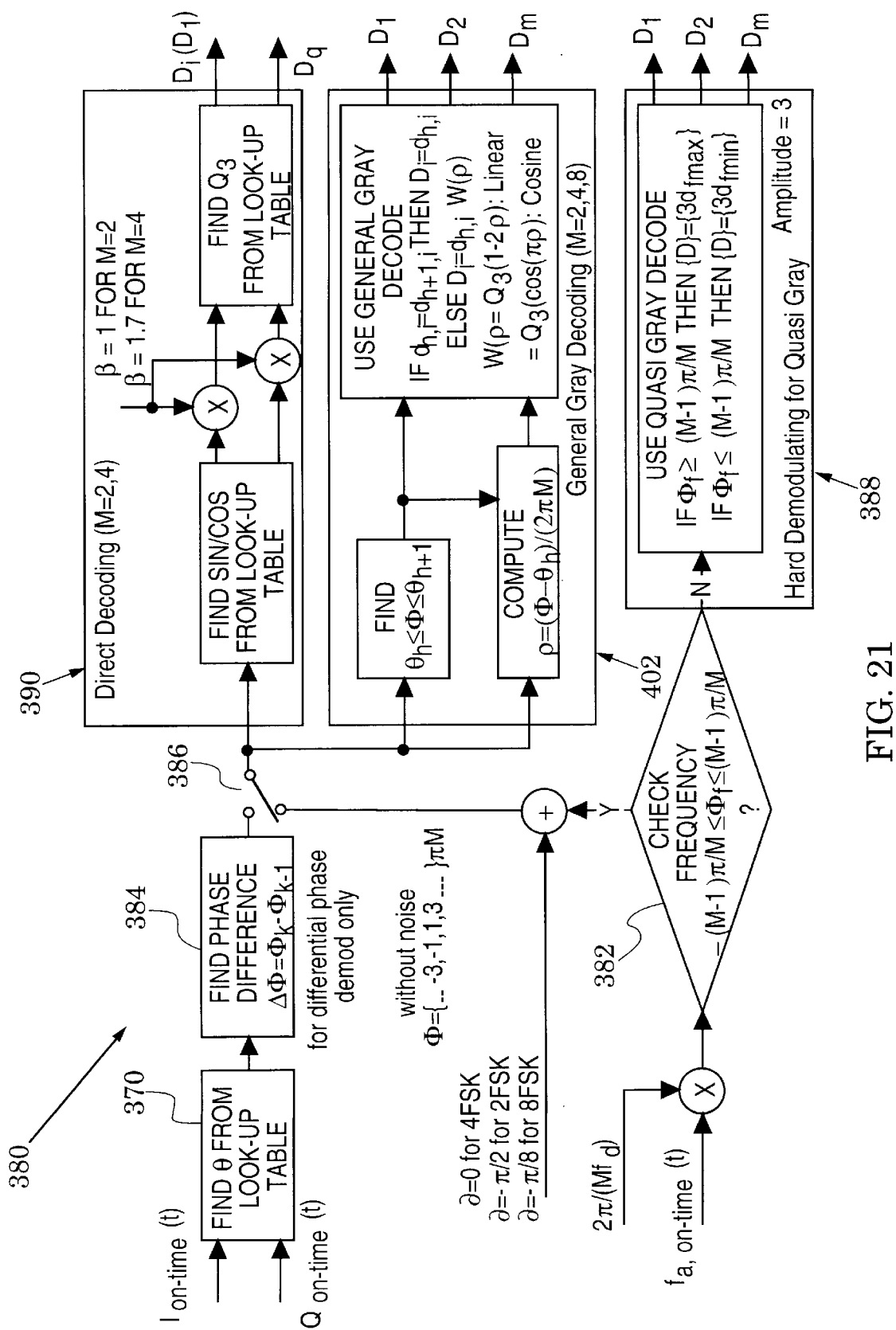
FIG. 21 is a flow chart of a common phase demodulator in the receive section of FIG. 3.

FIG. 21 illustrates a flow chart 380 of the common phase demodulator 72. As shown in the flow chart, an input signal can be a phase modulated waveform from the phase look-up table (340 in FIG. 3) for both DSPN or Non-spread waveforms. Alternatively, an input signal can be a frequency modulated waveform from the FSK to PSK converter 350 that is coupled to a decision step 382 of the flow chart.

For differential modulation processes, the phase is differenced in step 384 to extract ΔΦ for differential modulation. For other modulation processes, this step is bypassed.

For M-ary FSK signals, the frequency is checked in decision 382 and if −(M−1)π/M≦Φ$_f$≦(M−1)π/M is not true, soft demodulation is required. Phase shifting is performed to convert the phase constellation to that of MPSK signals. This phase shifting is in accordance with=0 for 4FSK,=−π/2 for 2FSK and=−π/8 for 8FSK. The resulting signal is then coupled through switch 386 to the proper demodulator as shown in FIG. 21.

If the decision in decision step 382 is no, the input signal is demodulated by the hard demodulating step 388 which uses a quasi gray decoding process.

If Φ$_f$≦−(M−1) /M, then {D}={3df$_{min}$}={±3,±3, . . . ±3}. That is, the sign bits are the same to that of f$_{min}$ (see tables 302, 304 and 306 of FIGS. 11A–11C) but has magnitude of 3. Alternatively, if Φ$_f$≧(M−1) /M then {D}={3dfmax}={±3, ±3, . . . ±3}. That is, the sign bits correspond to f$_{max}$ but with magnitude of 3.

Figure 22:
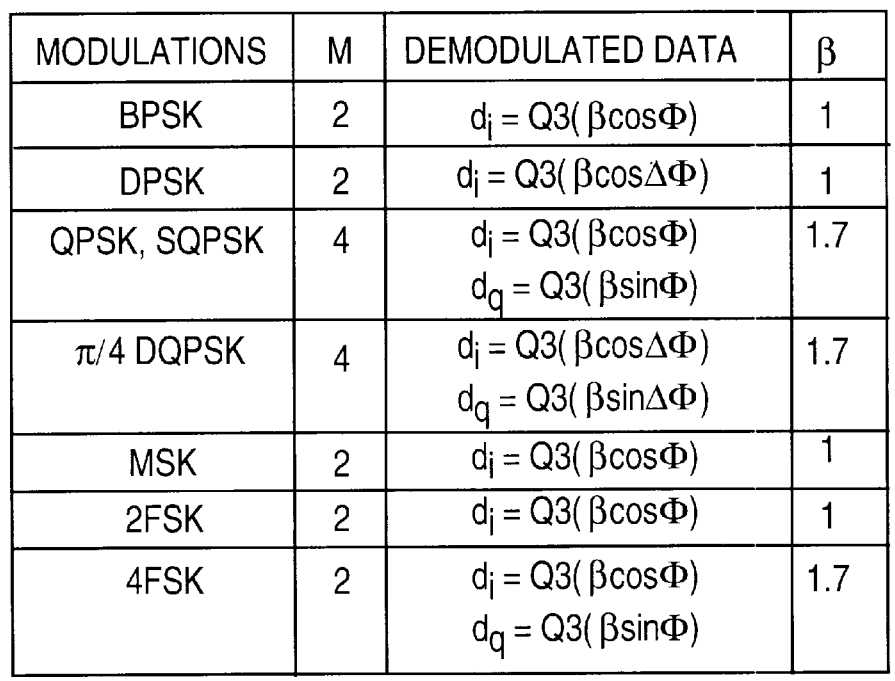
FIG. 22 is a table which specifies demodulation processes in the common phase demodulator of FIG. 21.

For modulation processes in which the phase states M are 2 or 4, direct decoding of step 390 can be used to soft demodulate the data. This decoding is in accordance with table 400 of FIG. 22. In this table, Q3(x) represents a 3 bit quantizing process defined as $$Q3(x)=\text{Nearest Integer}\{3^*\min(1,abs(x))^*\text{sign}(x)\}.$$

For modulation processes in which the phase states M are equal to 2, 4 or 8 (e.g., 8-ary FSK) the general gray decoding of step 402 is employed. Alternatively, if M is 2 or 4, the direct decoding of step 390 can be used.

In step 402, the gray coded symbol represents the multi bits of tables 302, 304: and 306 of FIGS. 11A–11C so that $$\theta_h<=>(a_{h1},a_{h2},\ldots,a_{hm})$$

in which h=1,2 and m=log$^2$M.

Process step 402 then includes the steps of:

a) locating two phase constellations in which θ$_h$<Φ<θ$_{h+1}$;

b) calculating the offset ρ from θ$_h$ as (Φ−θ$_h$)/(θ$_{h+1}$−θ$_h$) which is equal to (Φ−θ$_h$)/(2π/M); and c) finding the soft decoded (d$_1$, d$_2$, . . . , d$_m$) in which $$d_j=3a_{k,j}\text{ if }a_{k,j}=a_{k+1,j}\text{ for }j=1,2,\ldots m;\text{ and}$$

$$d_j=W(\rho)\,a_{k,j}\text{ if }a_{k,j}\,a_{k+1,j}\text{ for }j=1,2,\ldots m$$

in which $W(\rho)=Q3(1-2\rho)=\{-3, -2, -1, 0, 1, 2, 3\}$ for linear weighting and $W(\rho)=Q3(\cos(\pi r))=\{-3, -2, -1, 0, 1, 2, 3\}$ for cosine weighting.

The processes recited above are preferably facilitated with look-up tables. The processes of the CPS receive section (60 in FIG. 3) (in particular, the processes of flow chart 380 of FIG. 21 and of table 400 of FIG. 22) are preferably implemented with the aid of the computer 260 of FIG. 2 which is also shown in association with the elements of FIG. 3. The computer is programmed in accordance with the flow chart 380 and the table 400.

The encoder 42 of the CPS transmit section (40 in FIG. 2) includes structures for convolutionally and differentially encoding the input data stream (22 in FIG. 2). Accordingly, the common phase demodulator 72 of FIG. 3 is followed by a decoder 404 which preferably includes a data controller, a Viterbi decoder and a differential decoder.

The data controller aligns data for the Viterbi decoder by processes of data dropping, data swapping and data depuncturing. The data dropper is configured to drop individual input samples from the data stream, if the data is out of synchronization. The data swapper is configured to invert the data sequence if the data sequence is different from that expected by the Viterbi decoder. The depuncturing process depunctures an input data stream by periodically adding a data sample to the data stream with a null soft value. This puncture pattern is aligned with the pattern in the encoder (42 in FIG. 2).

The Viterbi decoder receives noise-corrupted, convolutionally-encoded data samples and determines the data sequence with the maximum likelihood probability. The decoding constraint lengths (from k=4 to k=9) and polynomials are preferably programmed by the computer (260 in FIG. 3).

The differential decoder receives two data samples (the current sample and the previous sample) and performs an exclusive-or function on them to create a new data sample.

The CPS receive section 60 of FIG. 3 also includes an interleaver 410 which couples the early, late, on-time and noise samples to the phase and frequency offset estimator 68, the time estimator 70, the common phase demodulator 72 and a data acquistion section 412 which acquires the initial frequency, phase and time estimates.

The CSP 20 of FIGS. 1–3 (further illustrated in detail in FIGS. 4–22) is particularly suited for realization as an application-specific integrated circuit (.ASIC) which can be integrated in transceivers that operate in different frequency bands and can modulate and demodulate different communication waveforms with different characteristics.

Figure 23:
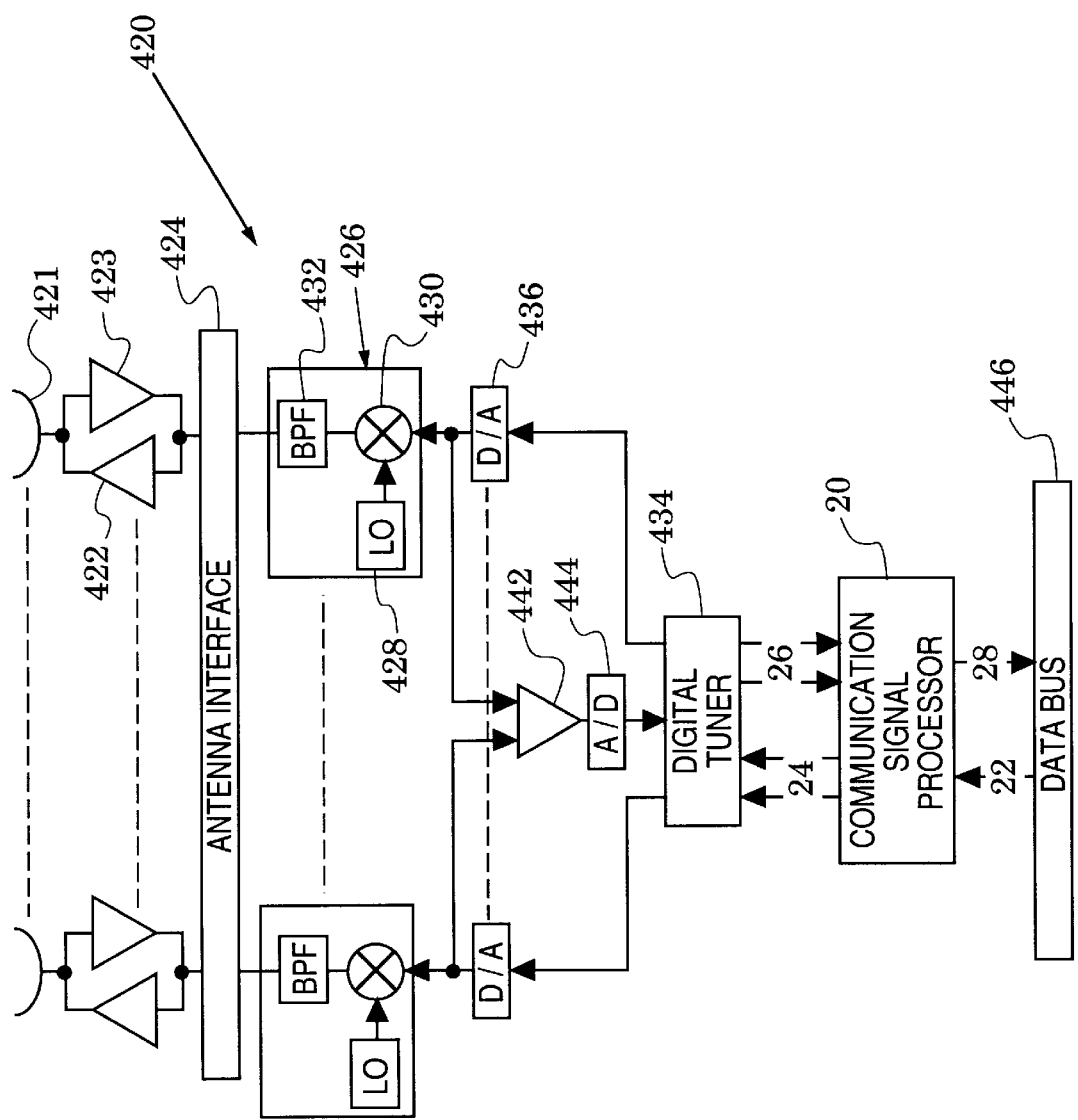
FIG. 23 is a block diagram of an exemplary multiband, multimode digital transceiver which includes the communication signal processor of FIG. 1.

FIG. 23 illustrates an exemplary multiband, multimode digital transceiver 420 which includes the CSP 20 of FIGS. 1–3. The transceiver 420 has a plurality of antennas 421 for transmitting and receiving radio frequency (RF) signals. Closely coupled to each of the antennas 421 is a high power amplifier (HPA) 422 and a low-noise amplifier (LNA) 423. These microwave amplifiers are coupled through an antenna interface 424 (e.g., a microwave hybrid) to analog front ends 426. Each of the analog front ends has a local oscillator 428, a mixer 430 and a bandpass filter 432.

An n-channel digital tuner 434 is coupled, on a transmit path, to the analog front ends 426 with a plurality of digital-to-analog converters (DAC) 436. On a receive path, the digital tuner 434 is coupled to the analog front ends 426 by a sum amplifier 442 and an analog-to-digital converter (ADC) 444. Received signals are preferably combined in the sum amplifier 442 so that they share a common signal bandwidth. The CSP 20 of FIGS. 1–3 is coupled between the digital tuner 434 and a data bus 446 which can be accessed by a variety of user devices (e.g., pagers, cellular telephones, laptop computers, point-to-point radios and automotive radios).

In transmit operation of the transceiver 420, an input data stream d (t) 22 (also 22 in FIG. 2) is converted into baseband I and Q signals 24 (also 24 in FIG. 2) by the CSP 20. These baseband I and Q signals are processed and upconverted by the digital tuner 434 into a digital intermediate frequency (IF) signal. The digital IF signal is then converted to an analog IF signal by one of the digital-to-analog converters 436. This IF signal is filtered and upconverted to radio frequency (RF) by one of the analog front ends 426. The RF signal coupled through the antenna interface 424 for amplification in a HPA 422 and radiation from one of the antennas 421.

In receive operation of the transceiver 420, RF signals of different frequency bands are coupled from the antennas 421 to LNA's 423 for low-noise amplification. The output of the LNA's is downconverted to filtered IF signals in the analog front ends 426. These IF signals preferably have frequencies which are selected to be within the Nyquist bandwidth of the analog-to-digital converter 444. The IF signals are amplified in the sum amplifier 442 and the amplified signals are converted to digital samples in the analog-to-digital converter 444. The digital samples are then fed into the n-channel digital tuner 434 to extract the desired signals by splitting them into I and Q components, translating them from IF frequencies to baseband signals 26 and filtering them to their selected bandwidths. The resultant baseband I and Q signals 26 (also 26 in FIG. 3) are processed by the CSP 20 to recover a data stream d(t) 28 (also 28 in FIG. 3).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of processing an input data stream d(t) into output baseband in-phase and quadrature signals I(t) and Q(t) which facilitate the generation of a plurality of different in-phase and quadrature modulated signals and of processing a plurality of different demodulated input baseband in-phase and quadrature signals I(t) and Q(t) into an output data stream d(t), said input and output data streams d(t) being formed of data bits having a bit duration, said method comprising the steps of:

receiving a modulation selection signal which indicates a selected one of the following modulation processes;
   a) binary phase shift keying,
   b) differential phase shift keying,
   c) quadrature phase shift keying,
   d) differential quadrature phase shift keying,
   d) offset quadrature phase shift keying,
   e) π/4 quadrature phase shift keying,
   f) shaped quadrature phase shift keying, and
   g) M-ary phase shift keying;

receiving said input data stream d(t);

in response to said selection signal, converting said input data stream d (t) into said output baseband in-phase and quadrature signals I(t) and Q(t) which will modulate in-phase and quadrature sinusoidal signals in accordance with said selected modulation process;

receiving said input baseband in-phase and quadrature signals I(t) and Q(t) which have been generated by demodulation in accordance with said selected modulation process; and in response to said selection signal, recovering said output data stream d(t) from said input baseband in-phase and quadrature signals I(t) and Q(t).

2. The method of claim 1, wherein said modulation processes further include M-ary frequency shift keying.

3. The method of claim 2, wherein said modulation processes further include minimum shift keying.

4. The method of claim 3, wherein:

said selected modulation process is one of the set of minimum phase shift keying, binary phase shift keying, quadrature phase shift keying and offset quadrature phase shift keying; and said recovering step includes the steps of:

measuring phase and frequency offsets in said input baseband in-phase and quadrature signals I(t) and Q(t); and providing said phase and frequency offsets as an output signal to facilitate phase and frequency locking to said input baseband in-phase and quadrature signals I(t) and Q(t).

5. The method of claim 4, wherein said measuring step includes the steps of;

converting said input baseband in-phase and quadrature signals I(t) and Q(t) into a phase sequence with a look-up table;

finding sine and cosine pairs of said phase sequence; and integrating said sine and cosine pairs to facilitate an increase in the signal-to-noise ratio of said input baseband in-phase and quadrature signals I(t) and Q(t).

6. The method of claim 4, wherein said measuring step includes the steps of;

converting said input baseband in-phase and quadrature signals I(t) and Q(t) into a phase sequence with a look-up table;

finding sine and cosine pairs of said phase sequence;

integrating said sine and cosine pairs to obtain integrated sine/cosine pairs; and converting said integrated sine/cosine pairs to obtain said phase offset.

7. The method of claim 2, wherein said converting step includes the steps of:

providing a code which relates bit combinations of said input data stream cd(t) to different ones of phases θ;

changing, with said code, said input data stream d(t) into a phase stream θ(t); and generating said output baseband in-phase and quadrature signals I(t) and Q(t) in accordance with the equations I(t)=cos θ(t) and Q(t)=sin θ(t).

8. The method of claim 2, wherein:

said selected modulation process is M-ary frequency shift keying; and further including the steps of:

changing said input baseband in-phase and quadrature signals I(t) and Q(t) into phase signals in the phase domain with a selected one of an arctangent function or a look-up table;

differentiating said phase signals to obtain a frequency signal with M levels;

match filtering said frequency signal to obtain matched frequency signals;

scaling said matched frequency signals to find corresponding phases;

multiplying said corresponding phases by a normalizing factor to obtain normalized phases;

finding sine and cosine values of said normalized phases;

adjusting said sine and cosine values by a weighting factor of substantially 1 for binary phase shift keying and an adjustment factor of substantially 1.7 for quadrature phase shift keying to realize weighted sine and cosine values; and quantizing said weighted sine and cosine values to recover said output data stream d(t).

9. The method of claim 2, wherein said selected modulation process is M-ary frequency shift keying; and further including the steps of:

changing said input baseband in-phase and quadrature signals I(t) and Q(t) into phase signals in the phase domain with a selected one of an arctangent function or a look-up table;

differentiating said phase signals to obtain a frequency signal with M levels;

match filtering said frequency signal to obtain matched frequency signals; and scaling said matched frequency signals to find corresponding phase signals.

10. The method of claim 1, wherein said selected modulation process is binary phase shift keying and said converting step includes the step of generating said output baseband in-phase and quadrature signals I(t) and Q(t) in accordance with the equations I(t)=d(t) and Q(t)=0.

11. The method of claim 1, wherein said selected modulation process is differential phase shift keying and said converting step includes the step of generating said output baseband in-phase and quadrature signals I(t) and Q(t)in accordance with the equations I(t)=d(t)d(-$T_{s1}$) and Q(t)= 0wherein a symbol duration $T_{s1}$is substantially equal to said bit duration.

12. The method of claim 1, wherein said selected modulation process is quadrature phase shift keying and said converting step includes the steps of:

dividing said input data stream d(t) into in-phase and quadrature input data streams di(t) and dq(t); and generating said output baseband in-phase and quadrature signals I(t) and Q(t) in accordance with the equations I(t)=$d_i(t)$ and Q(t)=$d_q(t)$.

13. The method of claim 1, wherein said selected modulation process is offset quadrature phase shift and said converting step includes the steps of:

dividing said input data stream d(t) into inphase and quadrature data steams $d_i(t)$ and $d_q(t)$; and generating said output baseband in-phase and quadrature signals I(t) and Q(t) in accordance with the equations I(t)=$d_i(t)$ and Q(t)=$d_q(t-T_{s2}/2)$ wherein a symbol duration $T_s$ is substantially twice said bit duration.

14. The method of claim 1, wherein said converting step includes the steps of:

providing a code which relates bit combinations of said input data stream d(t) to different ones of phases θ;

changing, with said code, said input data stream d(t) into a phase stream θ(t); and generating said output baseband in-phase and quadrature signals I(t) and Q(t) in accordance with the equations I(t)=cos θ(t) and Q(t)=sin θ(t).

15. The method of claim 14, wherein said code is a gray code.

16. The method of claim 14, further including the step of sampling said phase stream θ(t) at a sampling rate which exceeds a bit rate $R_b$ that is the inverse of said bit duration.

17. The method of claim 14, further including the step of shaping said phase stream θ(t) to reduce the phase rate of change at phase transitions of said phase stream θ(t).

18. The method of claim 14, wherein:
said selected modulation process is binary phase shift keying;
said providing step includes the step of choosing said code to relate each possible state of said input data stream d(t) to a different one of two phases $\theta_1$, $\theta_2$; and
said generating step includes the step of setting Q(t) =0.

19. The method of claim 14, wherein:
said selected modulation process is differential phase shift keying;
said providing step includes the step of choosing said code to relate each possible state of said input data stream d(t) to a different one of two phases $\phi_1$, $\phi_2$;
said changing step includes the step of finding θ(t) by integration in accordance with the equation $\theta(t)=\theta(t-T_{s1})+\phi$ in which a symbol duration $T_{s1}$ is substantially equal to said bit duration; and
said generating step includes the step of setting Q(t)=0.

20. The method of claim 14, wherein said selected modulation process is quadrature phase shift keying; and
further including the step of dividing said input data stream d(t) into in-phase and quadrature data streams $d_i(t)$ and $d_q(t)$; and
wherein said providing step includes the step of choosing said code to relate each possible state combination of said in-phase and quadrature data streams $d_i(t)$ and $d_q(t)$ to a different one of four phases $\theta_1, \theta_2, \theta_3$ and $\theta_4$.

21. The method of claims 14, wherein said selected modulation process is offset quadrature phase shift keying; and
further including the steps of:
dividing said input data stream d(t) into two bit streams; and
delaying one of said bit streams to form in-phase and quadrature data streams $d_i(t)$ and $d_q(t-(T_{s2}/2))$ in which a symbol duration $T_{s2}$ is substantially twice said bit duration; and
wherein said providing step includes the step of choosing said code to relate each possible state combination of said in-phase and quadrature data streams $d_i(t)$ and $d_q(t)$ to a different one of four phases $\theta_1, \theta_2, \theta_3$ and $\theta_4$.

22. The method of claim 14, wherein said selected modulation process is π/4 differential quadrature phase shift keying; and
further including the step of dividing said input data stream d(t) into in-phase and quadrature data streams $d_i(t)$ and $d_q(t)$; and
wherein:
said providing step includes the step of choosing said code to relate each possible state combination of said in-phase and quadrature data streams $d_i(t)$ and $d_q(t)$ to a different one of four phases $\phi_1, \phi_2, \phi_3$ and $\phi_4$; and
said changing step includes the step of finding θ(t) in accordance with the equation θ(t)=θ(t−1)+θ.

23. The method of claim 14, wherein said selected modulation process is M-ary phase shift keying; and
further including the step of dividing said input data stream d(t) into N data streams $d_1(t), d_2(t) - - - d_N(t)$ in which $2^N=M$; and
wherein said providing step includes the step of choosing said code to relate each possible state combination of said N data streams to a different one of M phases $\theta_1, \theta_2, - - - \theta_M$.

24. The method of claim 1, further including the steps of:
providing a resampling clock signal; and
resampling said output baseband in-phase and quadrature signals I(t) and Q(t).

25. The method of claim 1, further including the step of encoding said input data stream d(t) to facilitate error correction and removal of data ambiguity.

26. The method of claims 25, wherein said encoding step includes the step of convolutionally encoding said input data stream d(t) to facilitate error correction.

27. The method of claim 25, wherein said encoding step includes the step of convolutionally encoding said input data stream d(t) to facilitate the removal of data ambiguity.

28. The method of claim 1, further including the steps of:
forming a pseudo-noise code sequence of psuedorandom bits which have a chip duration which is less than said bit duration; and
multiplying said input data steam d(t) with said pseudo-noise code sequence to facilitate spectrum spreading.

29. The method of claim 1, wherein:
said selected modulation process is one of the set of binary phase shift keying, quadrature phase shift keying, offset quadrature phase shift keying and π/4 quadrature phase shift keying; and
said recovering step includes the steps of:
converting said input baseband in-phase and quadrature signals I(t) and Q(t) to corresponding phases;
finding sine and cosine values of said corresponding phases;
adjusting said sine and cosine values by a weighting factor of substantially 1 for binary phase shift keying and an adjustment factor of substantially 1.7 for quadrature phase shift keying to realize weighted sine and cosine values; and
quantizing said weighted sine and cosine values to recover said output data stream d(t).

30. The method of claim 29, wherein said converting step includes the step of employing a signal-to-phase look-up table.

31. The method of claim 29, wherein said finding step includes the step of employing a sine/cosine look-up table.

32. The method of claims 29, wherein said selected modulation process is one of the set of differential phase shift keying and differential quadrature phase shift keying and further including the step of differencing said corresponding phases prior to said finding step.

33. The method of claim 1, wherein:
said selected modulation process is M-ary phase shift keying; and
said recovering step includes the steps of:
converting said input baseband in-phase and quadrature signals I(t) and Q(t) to corresponding phases;
finding, from a set of phase constellations, a reference phase constellation which approximates said corresponding phases;
calculating a phase offset between said reference phase constellation and said corresponding phases;
quantizing said phase offset to find a weighting constant; and
extracting bits from said reference phase constellation and weighting said bits with said weighting constant to recover said output data stream d(t).

34. The method of claim 1, further including the steps of:
comparing a received amplitude of said input baseband in-phase and quadrature signals I(t) and Q(t) to a predetermined amplitude; and shifting bits in said input baseband in-phase and quadrature signals I(t) and Q(t) to reduce the difference between said received amplitude and said predetermined amplitude.

35. The method of claim 1, wherein said input baseband in-phase and quadrature signals I(t) and Q(t) have a received symbol rate and further including the step of resampling said input baseband in-phase and quadrature signals I(t) and Q(t) at a rate which is substantially four times said received symbol rate.

36. The method of claim 1, wherein said input baseband in-phase and quadrature signals I(t) and Q(t) is a spread waveform and has a received chip rate and further including the step of resampling said input baseband in-phase and quadrature signals I(t) and Q(t) at a rate which is substantially twice said received chip rate.

37. The method of claim 1, wherein said input baseband in-phase and quadrature signals I(t) and Q(t) have an amplitude offset and further including the step of shifting the phase and frequency of said input baseband in-phase and quadrature signals I(t) and Q(t) to reduce said amplitude offset.

38. The method of claim 1, wherein said input baseband in-phase and quadrature signals I(t) and Q(t) have a spread waveform and further including the steps of:
generating a pseudonoise sequence; and
correlating said input baseband in-phase and quadrature signals I(t) and Q(t) with said pseudonoise sequence to despread said input baseband in-phase and quadrature signals I(t) and Q(t).

39. The method of claim 1, wherein said input baseband in-phase and quadrature signals I(t) and Q(t) have a non-spread waveform and further including the steps of:
sampling said input baseband in-phase and quadrature signals I(t) and Q(t) to obtain early, on-time and late samples;
integrating said early, on-time and late samples to find a time offset.

40. The method of claim 1, further including the step of converting said input baseband in-phase and quadrature signals I(t) and Q(t) to a phase stream with a look-up table.

41. The method of claim 1, wherein said input baseband in-phase and quadrature signals I(t) and Q(t) have a spread waveform and further including the steps of:
sampling said input baseband in-phase and quadrature signals I(t) and Q(t) to obtain early, on-time and late samples;
in response to said early, on-time and late samples, estimating a time offset.

42. A multiband, multimode transceiver for use by communication devices, comprising:
a plurality of antennas for radiation and reception of microwave signals;
a plurality of analog front ends configured for upconversion and downconversion of signals;
a plurality of high power amplifiers, each of said high power amplifiers coupled between a different pair of said antennas and said analog front ends for amplification of transmitted ones of said microwave signals;
a plurality of low-noise amplifiers, each of said low-noise amplifiers coupled between a different pair of said antennas and said analog front ends for low-noise amplification of received ones of said microwave signals;
a plurality of digital-to-analog converters coupled to form transmit paths to different ones of said analog front ends;
an analog-to-digital converter coupled to form a receive path from said analog front ends;
a data bus providing access for said communication devices to said transceiver;
a communication signal processor coupled to receive an input data stream d(t) from said data bus; and
a digital tuner configured to receive output baseband I and Q signals from said signal processor and upconvert them to intermediate-frequency signals which are coupled along said transmit paths and to receive digital samples along said receive path and deliver input baseband in-phase and quadrature signals I(t) and Q(t) to said signal processor;
said signal processor having a computer programmed to receive a selection signal which indicates a selected one of the following modulation processes;
a) binary phase shift keying,
b) differential phase shift keying,
c) quadrature phase shift keying,
d) differential quadrature phase shift keying,
d) offset quadrature phase shift keying,
e) π/4 quadrature phase shift keying,
f) shaped quadrature phase shift keying, and
g) M-ary phase shift keying;
and in response to said selection signal, to perform the steps of converting said input data stream d(t) into said output baseband in-phase and quadrature signals I(t) and Q(t) and recovering an output data stream d(t) from said input baseband in-phase and quadrature signals I(t) and Q (t) and coupling said output data stream d(t) to said data bus.

43. The transceiver of claim 42, wherein said modulation processes further include M-ary frequency shift keying.

44. The transceiver of claim 42, wherein said modulation processes further include minimum shift keying.

45. The transceiver of claim 42, wherein said selected modulation process is binary phase shift keying and said converting step includes the step of generating said output baseband in-phase and quadrature signals I(t) and Q(t) in accordance with the equations I(t)=d(t) and Q(t)=0.

46. The transceiver of claim 42, wherein said selected modulation process is differential phase shift keying and said converting step includes the step of generating said output baseband in-phase and quadrature signals I(t) and Q(t) in accordance with the equations I(t)=d(t)d (t−$T_{s1}$) and Q(t)=0 wherein a symbol duration $T_{s1}$ is substantially equal to said bit duration.

47. The transceiver of claim 42, wherein said selected modulation process is quadrature phase shift keying and said converting step includes the steps of:
dividing said input data stream d(t) into in-phase and quadrature input data streams $d_i(t)$ and $d_q(t)$; and
generating said output baseband in-phase and quadrature signals I(t) and Q(t) in accordance with the equations I(t)=$d_i(t)$ and Q(t)=$d_q(t)$.

48. The transceiver of claim 42, wherein said selected modulation process is offset quadrature phase shift keying and said converting step includes the steps of:
dividing said input data stream d(t) into in-phase and quadrature data streams $d_i(t)$ and $d_q(t)$; and
generating said output baseband in-phase and quadrature signals I(t) and Q(t) in accordance with the equations I(t)=$d_i(t)$ and Q(t)=$d_q(t-T_{s2}/2)$ wherein a symbol duration $T_{s2}$ is substantially twice to said bit duration.

49. The transceiver of claim 42, wherein said converting step includes the steps of:

providing a code which relates bit combinations of said input data stream d(t) to different ones of phases θ;

changing, with said code, said input data stream d(t) into a phase stream θ(t); and generating said output baseband in-phase and quadrature signals I(t) and Q(t) in accordance with the equations I(t)=cosθ(t) and Q(t)=sin θ(t).

50. The transceiver of claim 42, wherein:

said selected modulation process is one of the set of binary phase shift keying, quadrature phase shift keying, offset quadrature phase shift keying and π/4 quadrature phase shift keying; and said recovering step includes the steps of:
    converting said input baseband in-phase and quadrature signals I(t) and Q(t) to corresponding phases;
    finding sine and cosine values of said corresponding phases;
    adjusting said sine and cosine values by a weighting factor of substantially 1 for binary phase shift keying and an adjustment factor of substantially 1.7 for quadrature phase shift keying to realize weighted sine and cosine values; and
    quantizing said weighted sine and cosine values to recover said output data stream d(t).

51. The transceiver of claim 42, wherein:

said selected modulation process is M-ary phase shift keying; and said recovering step includes the steps of:
    converting said input baseband in-phase and quadrature signals I(t) and Q(t) to corresponding phases;
    finding, from a set of phase constellations, a reference phase constellation which approximates said corresponding phases;
    calculating a phase offset between said reference phase constellation and said corresponding phases;
    quantizing said phase offset to find a weighting constant; and
    extracting bits from said reference phase constellation and weighting said bits with said weighting constant to recover said output data stream d(t).

52. The transceiver of claim 42, wherein:

said selected modulation process is M-ary frequency shift keying; and further including the steps of:
    changing said input baseband in-phase and quadrature signals I(t) and Q(t) into phase signals in the phase domain with a selected one of an arctangent function or a look-up table;
    differentiating said phase signals to obtain a frequency signal with M levels;
    match filtering said frequency signal to obtain matched frequency signals;
    scaling said matched frequency signals to find corresponding phases;
    multiplying said corresponding phases by a normalizing factor to obtain normalized phases;
    finding sine and cosine values of said normalized phases;
    adjusting said sine and cosine values by a weighting factor of substantially 1 for binary phase shift keying and an adjustment factor of substantially 1.7 for quadrature phase shift keying to realize weighted sine and cosine values; and
    quantizing said weighted sine and cosine values to recover said output data stream d(t).

\* \* \* \* \*